US012791829B2

United States Patent

Gregoire et al.

(12) United States Patent
(10) Patent No.: US 12,791,829 B2
(45) Date of Patent: Nov. 10, 2026

(54) LENS POSITION DETERMINATION IN DEPTH IMAGING

(71) Applicant: AIRY3D INC., Montreal (CA)

(72) Inventors: Pascal Gregoire, Montreal (CA); Simon Summy, Montreal (CA)

(73) Assignee: AIRY3D INC. (CA)

( * ) Notice: Subject to any disclaimer, the term of this patent is extended or adjusted under 35 U.S.C. 154(b) by 536 days.

(21) Appl. No.: 18/272,254

(22) PCT Filed: Jan. 7, 2022

(86) PCT No.: PCT/CA2022/050018
§ 371 (c)(1),
(2) Date: Jul. 13, 2023

(87) PCT Pub. No.: WO2022/150903
PCT Pub. Date: Jul. 21, 2022

(65) Prior Publication Data

US 2024/0069307 A1 Feb. 29, 2024

Related U.S. Application Data

(60) Provisional application No. 63/137,791, filed on Jan. 15, 2021.

(51) Int. Cl.
*G02B 7/38* (2021.01)

(52) U.S. Cl.
CPC .................................... *G02B 7/38* (2013.01)

(58) Field of Classification Search
CPC ....................................................... G02B 7/38
(Continued)

(56) References Cited

U.S. PATENT DOCUMENTS 4,893,765 A 1/1990 Randolph
2010/0108765 A1* 5/2010 Vinogradov ......... G02B 26/005 235/462.22
(Continued)

FOREIGN PATENT DOCUMENTS

DE 29807844 U1 7/1998
EP 1216943 A2 6/2002
(Continued)

OTHER PUBLICATIONS

Kunnath, "Depth from Defocus using Angle Sensitive Pixels based on a Transmissive Diffraction Mask," A thesis submitted in partial fulfillment for the degree of Master of Science, McGill University, 56 pgs. (Jan. 2018).

(Continued)

*Primary Examiner* — Sharrief I Broome
(74) *Attorney, Agent, or Firm* — Barnes & Thornburg; Steven D. Shipe

(57) ABSTRACT

A method of lens position determination in an imaging system is disclosed. The system can include an imaging lens, an image sensor, and an optical encoder interposed between the imaging lens and the image sensor. The method can include capturing image data from a scene by detecting, with the array of pixels of the image sensor, light incident from the scene having passed through the imaging lens and the encoder, the encoder being configured to encode angle-dependent information about the incident light in the image data in accordance with an angular response of the encoder. The method can also include generating a uniform-field image from the captured image data, the uniform-field image having an intensity profile that varies with image position in accordance with the encoded angle-dependent information. The method can further include determining
(Continued)

current lens position information about the imaging lens from the intensity profile of the uniform-field image.

21 Claims, 18 Drawing Sheets

(58) Field of Classification Search
USPC .......................................................... 359/823
See application file for complete search history.

(56) References Cited

U.S. PATENT DOCUMENTS

| | | | | |
|---|---|---|---|---|
| 2013/0286194 A1* | 10/2013 | Horiguchi | G02B 7/04 | 359/823 |
| 2014/0218590 A1* | 8/2014 | Nunnink | G06T 7/80 | 348/345 |
| 2016/0091372 A1* | 3/2016 | Zhu | G02B 7/28 | 356/498 |

FOREIGN PATENT DOCUMENTS

| | | |
|---|---|---|
| WO | WO 2017/210781 | 12/2017 |
| WO | WO 2019/109182 | 6/2019 |
| WO | WO 2020/243828 | 12/2020 |

OTHER PUBLICATIONS

Search Report & Written Opinion issued in PCT/CA2022/050018 (Apr. 12, 2022).

Search Report in EP Patent Application No. 22738855.0, dated Nov. 11, 2024, 8 pages.

International Search and Written Opinion for PCT/IB2023/057691, mailed Nov. 23, 2023.

* cited by examiner

LENS POSITION DETERMINATION IN DEPTH IMAGING

CROSS REFERENCE TO RELATED PATENT APPLICATIONS

The present application is a national stage application under 35 U.S.C. § 371 of International Application No. PCT/CA2022/050018, filed Jan. 7, 2022, which claims priority to U.S. Provisional Patent Application No. 63/137,791, filed on Jan. 15, 2021. The above-referenced patent applications are each incorporated herein by reference in their entirety entireties.

TECHNICAL FIELD

The technical field generally relates to imaging technology, and more particularly, to lens position determination in depth imaging.

BACKGROUND

Traditional imaging techniques involve the projection of three-dimensional (3D) scenes onto two-dimensional (2D) planes, resulting in a loss of information, including a loss of depth information. This loss of information is a result of the nature of square-law detectors, such as charge-coupled devices (CCD) and complementary metal-oxide-semiconductor (CMOS) sensor arrays, which can only directly measure the time-averaged intensity of incident light. A variety of imaging techniques, both active and passive, have been developed that can provide 3D image information, including depth information. Non-limiting examples of 3D imaging techniques include, to name a few, stereoscopic and multiscopic imaging, time of flight, structured light, plenoptic and light field imaging, diffraction-grating-based imaging, and depth from focus or defocus. While each of these imaging techniques has certain advantages, each also has some drawbacks and limitations. Challenges therefore remain in the field of 3D imaging.

SUMMARY

The present description generally relates to techniques for lens position determination in depth imaging.

In accordance with an aspect, there is provided a method of lens position determination in an imaging system including an imaging lens, an image sensor including an array of pixels, and an optical encoder having an angular response and interposed between the imaging lens and the image sensor, the method including:

- capturing image data from a scene, the capturing including detecting, with the array of pixels of the image sensor, light incident from the scene having passed through the imaging lens and the optical encoder, the optical encoder being configured to encode angle-dependent information about the incident light having passed therethrough in the captured image data in accordance with the angular response;
- generating a uniform-field image from the captured image data, the uniform-field image having an intensity profile that varies with image position in accordance with the angle-dependent information encoded in the captured image data; and
- determining current lens position information about the imaging lens from the intensity profile of the generated uniform-field image.

In some embodiments, capturing the image data includes capturing the image data as a first set of pixel responses corresponding to a first set of pixels of the array of pixels of the image sensor and a second set of pixel responses corresponding to a second set of pixels of the array of pixels of the image sensor, the first set of pixel responses and the second set of pixel responses varying differently from each other as a function of angle of incidence in accordance with the angular response of the optical encoder; and generating the uniform-field image includes generating the uniform-field image as a plurality of image points, the generating including: computing a plurality of summed pixel responses based on a sum operation between the first set of pixel responses and the second set of pixel responses; computing a plurality of differential pixel responses based on a difference operation between the first set of pixel responses and the second set of pixel responses; and determining an intensity value of each image point of the uniform-field image as a ratio of a respective one of the plurality of differential pixel responses to a respective one of the plurality of summed pixel responses, the plurality of intensity values of the plurality of image points defining the intensity profile of the uniform-field image. In some embodiments, the pixel responses of the first set have magnitudes that increase as the angle of incidence increases, and where the pixel responses of the second set have magnitudes that decrease as the angle of incidence increases.

In some embodiments, the angle-dependent information encoded in the image data by the optical encoder includes a chief ray angle (CRA) function of the imaging lens over the array of pixels; a CRA shifting function of the optical encoder with respect to the array of pixels; and a range of angles of incidence within which the light incident from the scene reaches each pixel.

In some embodiments, determining the current lens position information about the imaging lens includes providing reference data relating an intensity profile of a reference uniform-field image to reference lens position information about the imaging lens; and determining the current lens position information from the intensity profile of the generated uniform-field image based on the reference data. In some embodiments, determining the current lens position information from the intensity profile of the uniform-field image based on the reference data includes: determining an intensity profile difference between the intensity profile of the generated uniform-field image and the intensity profile of the reference uniform-field image; determining lens position variation information from the intensity profile difference; and determining the current lens position information from the reference lens position information and the lens position variation information. In some embodiments, determining the lens position variation information from the intensity profile difference includes relating the intensity profile difference to a variation in a CRA function of the imaging lens; and determining the lens position variation information from the variation in the CRA function of the imaging lens using a model relating lens CRA function variations to changes in lens position. In some embodiments, the model relating lens CRA function variations to changes in lens position is established based on a nominal CRA function of the imaging lens defined at a nominal position of the imaging lens.

In some embodiments, determining the current lens position information includes determining an axial position of the imaging lens along an optical axis of the imaging lens. In some embodiments, determining the current lens position information includes determining a first lateral position of the imaging lens along a first lateral direction perpendicular to the optical axis of the imaging lens; and determining a second lateral position of the imaging lens along a second lateral direction perpendicular to both the optical axis of the imaging lens and the first lateral direction. In some embodiments, determining the current lens position information includes determining a first tilt angle of the imaging lens relative to the first lateral direction; and determining a second tilt angle of the imaging lens relative to the second lateral direction.

In some embodiments, the scene is representative of a uniform field; the captured image data includes at least one image of the scene; and the uniform-field image is generated from the at least one image of the scene without performing a prior step of removing depth cues from the at least one image of the scene. In some embodiments, the at least one image of the scene is a single image of the scene.

In some embodiments, the scene is not representative of a uniform field; the captured image data includes one or more images of the scene; and the method includes removing depth cues from the one or more images of the scene, combining the one or more images of the scene with removed depth cues into a fused image of the scene, and generating the uniform-field image from the fused image of the scene. In some embodiments, a number of the one or more images of the scene ranges between 3 and 300.

In some embodiments, the optical encoder includes a transmissive diffraction mask (TDM), the TDM being configured to diffract the light incident from the scene having passed through the imaging lens to generate diffracted light, the diffracted light having the angle-dependent information encoded in its intensity distribution for detection by the image sensor as the captured image data. In some embodiments, the TDM includes a binary phase grating including a series of alternating ridges and grooves extending along a grating axis at a grating period. In some embodiments, the image sensor has a pixel pitch along the grating axis, the pixel pitch being half of the grating period.

In some embodiments, the TDM includes a first set of diffraction gratings having a first grating axis orientation and a second set of diffraction gratings having a second grating axis orientation, the first grating axis orientation being perpendicular to the second grating axis orientation; generating the uniform-field image includes generating a first portion of the uniform-field image from a first portion of the captured image data having angle-dependent information encoded therein by the first set of diffraction gratings; and generating a second portion of the uniform-field image from a second portion of the captured image data having angle-dependent information encoded therein by the second set of diffraction gratings; and determining the current lens position information includes: determining first lens position information from a first intensity profile of the first portion of the uniform-field image; determining second lens position information from a second intensity profile of the second portion of the uniform-field image; and determining the current lens position information from the first lens position information and the second lens position information.

In some embodiments, the optical encoder includes an array of microlenses, each microlens covering at least two pixels of the image sensor. In some embodiments, each microlens covers two pixels of the image sensor. In some embodiments, each microlens covers four pixels of the image sensor, the four pixels being arranged in a 2×2 cell.

In some embodiments, the image sensor includes a color filter array interposed between the optical encoder and the array of pixels.

In accordance with another aspect, there is provided a method of focus distance adjustment in an imaging system including an imaging lens, an image sensor including an array of pixels, and an optical encoder having an angular response and interposed between the imaging lens and the image sensor, the method including:

- providing a target focus distance at which to set the imaging system;
- determining a target lens-to-sensor distance between the imaging lens and the image sensor corresponding to the target focus distance; and
- performing a lens position adjustment operation including one or more iterative cycles, each iterative cycle including:
  - moving the imaging lens with respect to the image sensor based on the target lens-to-sensor distance;
  - determining, using a method of lens position determination as described herein, current lens position information about the imaging lens, the current lens position information including a current lens-to-sensor distance between the imaging lens and the image sensor;
  - determining whether there is a match between the current lens-to-sensor distance and the target lens-to-sensor distance;
  - if there is a match between the current lens-to-sensor distance and the target lens-to-sensor distance, terminating the lens position adjustment operation and determining that the imaging system has been set at the target focus distance; and
  - if there is not a match between the current lens-to-sensor distance and the target lens-to-sensor distance, performing another iterative cycle.

In some embodiments, determining the target lens-to-sensor distance corresponding to the target focus distance includes computing the target lens-to-sensor distance from the target focus distance and a focal length of the imaging lens according to $z_{s,target}=[(1/f)-(1/z_{f,target})]^{-1}$, where $z_{s,target}$ is the target lens-to-sensor distance, f is the focal length of the imaging lens, and $z_{f,target}$ is an the target focus distance.

In accordance with another aspect, there is provided a non-transitory computer readable storage medium having stored thereon computer readable instructions that, when executed by a processor, cause the processor to perform a method of lens position determination in an imaging system including an imaging lens, an image sensor including an array of pixels, and an optical encoder having an angular response and interposed between the imaging lens and the image sensor, the method including:

- receiving image data from a scene captured by the image sensor, the image sensor being configured to detect, with the array of pixels, light incident from the scene having passed through the imaging lens and the optical encoder, the optical encoder being configured to encode angle-dependent information about the incident light having passed therethrough in the captured image data in accordance with the angular response;
- generating a uniform-field image from the captured image data, the uniform-field image having an intensity profile that varies with image position in accordance with the angle-dependent information encoded in the captured image data; and
- determining current lens position information about the imaging lens from the intensity profile of the generated uniform-field image.

In some embodiments, the captured image data includes a first set of pixel responses corresponding to a first set of pixels of the array of pixels of the image sensor and a second set of pixel responses corresponding to a second set of pixels of the array of pixels of the image sensor, the first set of pixel responses and the second set of pixel responses varying differently from each other as a function of angle of incidence in accordance with the angular response of the optical encoder; and generating the uniform-field image includes generating the uniform-field image as a plurality of image points, the generating including: computing a plurality of summed pixel responses based on a sum operation between the first set of pixel responses and the second set of pixel responses; computing a plurality of differential pixel responses based on a difference operation between the first set of pixel responses and the second set of pixel responses; and determining an intensity value of each image point of the uniform-field image as a ratio of a respective one of the plurality of differential pixel responses to a respective one of the plurality of summed pixel responses, the plurality of intensity values of the plurality of image points defining the intensity profile of the uniform-field image.

In some embodiments, determining the current lens position information about the imaging lens includes providing reference data relating an intensity profile of a reference uniform-field image to reference lens position information about the imaging lens; and determining the current lens position information from the intensity profile of the generated uniform-field image based on the reference data.

In some embodiments, determining the current lens position information from the intensity profile of the uniform-field image based on the reference data includes: determining an intensity profile difference between the intensity profile of the generated uniform-field image and the intensity profile of the reference uniform-field image; determining lens position variation information from the intensity profile difference; and determining the current lens position information from the reference lens position information and the lens position variation information.

In some embodiments, determining the lens position variation information from the intensity profile difference includes relating the intensity profile difference to a variation in a CRA function of the imaging lens; and determining the lens position variation information from the variation in the CRA function of the imaging lens using a model relating lens CRA function variations to changes in lens position.

In some embodiments, determining the current lens position information includes determining an axial position of the imaging lens along an optical axis of the imaging lens. In some embodiments, determining the current lens position information includes determining a first lateral position of the imaging lens along a first lateral direction perpendicular to the optical axis of the imaging lens; and determining a second lateral position of the imaging lens along a second lateral direction perpendicular to both the optical axis of the imaging lens and the first lateral direction. In some embodiments, determining the current lens position information includes determining a first tilt angle of the imaging lens relative to the first lateral direction; and determining a second tilt angle of the imaging lens relative to the second lateral direction.

In some embodiments, the scene is representative of a uniform field; the captured image data includes at least one image of the scene; and the uniform-field image is generated from the at least one image of the scene without performing a prior step of removing depth cues from the at least one image of the scene.

In some embodiments, the scene is not representative of a uniform field; the captured image data includes one or more images of the scene; and the method includes removing depth cues from the one or more images of the scene, combining the one or more images of the scene with removed depth cues into a fused image of the scene, and generating the uniform-field image from the fused image of the scene.

In some embodiments, the optical encoder includes a transmissive diffraction mask (TDM), the TDM being configured to diffract the light incident from the scene having passed through the imaging lens to generate diffracted light, the diffracted light having the angle-dependent information encoded therein for detection by the image sensor as the captured image data. In some embodiments, the TDM includes a binary phase grating including a series of alternating ridges and grooves extending along a grating axis at a grating period. In some embodiments, the image sensor has a pixel pitch along the grating axis, the pixel pitch being half of the grating period.

In some embodiments, the TDM includes a first set of diffraction gratings having a first grating axis orientation and a second set of diffraction gratings having a second grating axis orientation, the first grating axis orientation being perpendicular to the second grating axis orientation; generating the uniform-field image includes generating a first portion of the uniform-field image from a first portion of the captured image data having angle-dependent information encoded therein by the first set of diffraction gratings; and generating a second portion of the uniform-field image from a second portion of the captured image data having angle-dependent information encoded therein by the second set of diffraction gratings; and determining the current lens position information includes: determining first lens position information from a first intensity profile of the first portion of the uniform-field image; determining second lens position information from a second intensity profile of the second portion of the uniform-field image; and determining the current lens position information from the first lens position information and the second lens position information.

In some embodiments, the optical encoder includes an array of microlenses, each microlens covering at least two pixels of the image sensor. In some embodiments, each microlens covers two pixels of the image sensor. In some embodiments, each microlens covers four pixels of the image sensor, the four pixels being arranged in a 2×2 cell.

In accordance with another, there is provided a computer device including a processor and a non-transitory computer readable storage medium such as described herein, the non-transitory computer readable storage medium being operatively coupled to the processor.

In accordance with another aspect, there is provided an imaging system having lens position determination capabilities, the imaging system including:

- an imaging lens;
- an image sensor including an array of pixels;
- an optical encoder having an angular response and interposed between the imaging lens and the image sensor; and
- a computer device operatively coupled to the image sensor and including a processor and a non-transitory computer readable storage medium having stored thereon computer readable instructions that, when executed by the processor, cause the processor to perform operations,
- wherein the image sensor is configured to capture image data from a scene by detecting, with the array of pixels, light incident from the scene having passed through the imaging lens and the optical encoder, wherein the optical encoder is configured to encode angle-dependent information about the incident light having passed therethrough in the captured image data in accordance with the angular response, and wherein the operations performed by the processor include:

receiving the captured image data from the scene captured by the image sensor;

generating a uniform-field image from the captured image data, the uniform-field image having an intensity profile that varies with image position in accordance with the angle-dependent information encoded in the captured image data; and determining current lens position information about the imaging lens from the intensity profile of the generated uniform-field image.

In some embodiments, the image sensor is configured to capture the image data as a first set of pixel responses corresponding to a first set of pixels of the array of pixels and a second set of pixel responses corresponding to a second set of pixels of the array of pixels of the image sensor, the first set of pixel responses and the second set of pixel responses varying differently from each other as a function of angle of incidence in accordance with the angular response of the optical encoder; and generating the uniform-field image includes generating the uniform-field image as a plurality of image points, the generating including: computing a plurality of summed pixel responses based on a sum operation between the first set of pixel responses and the second set of pixel responses; computing a plurality of differential pixel responses based on a difference operation between the first set of pixel responses and the second set of pixel responses; and determining an intensity value of each image point of the uniform-field image as a ratio of a respective one of the plurality of differential pixel responses to a respective one of the plurality of summed pixel responses, the plurality of intensity values of the plurality of image points defining the intensity profile of the uniform-field image.

In some embodiments, determining the current lens position information about the imaging lens includes providing reference data relating an intensity profile of a reference uniform-field image to reference lens position information about the imaging lens; and determining the current lens position information from the intensity profile of the generated uniform-field image based on the reference data. In some embodiments, determining the current lens position information from the intensity profile of the uniform-field image based on the reference data includes: determining an intensity profile difference between the intensity profile of the generated uniform-field image and the intensity profile of the reference uniform-field image; determining lens position variation information from the intensity profile difference; and determining the current lens position information from the reference lens position information and the lens position variation information. In some embodiments, determining the lens position variation information from the intensity profile difference includes relating the intensity profile difference to a variation in a CRA function of the imaging lens; and determining the lens position variation information from the variation in the CRA function of the imaging lens using a model relating lens CRA function variations to changes in lens position.

In some embodiments, determining the current lens position information includes determining an axial position of the imaging lens along an optical axis of the imaging lens, a first lateral position of the imaging lens along a first lateral direction perpendicular to the optical axis of the imaging lens, a second lateral position of the imaging lens along a second lateral direction perpendicular to both the optical axis of the imaging lens and the first lateral direction, a first tilt angle of the imaging lens relative to the first lateral direction, a second tilt angle of the imaging lens relative to the second lateral direction, or any combination thereof.

In some embodiments, the optical encoder includes a transmissive diffraction mask (TDM), the TDM being configured to diffract the light incident from the scene having passed through the imaging lens to generate diffracted light, the diffracted light having the angle-dependent information encoded therein for detection by the image sensor as the captured image data. In some embodiments, the TDM includes a binary phase grating including a series of alternating ridges and grooves extending along a grating axis at a grating period. In some embodiments, the image sensor has a pixel pitch along the grating axis, the pixel pitch being half of the grating period.

In some embodiments, the TDM includes a first set of diffraction gratings having a first grating axis orientation and a second set of diffraction gratings having a second grating axis orientation, the first grating axis orientation being perpendicular to the second grating axis orientation; generating the uniform-field image includes generating a first portion of the uniform-field image from a first portion of the captured image data having angle-dependent information encoded therein by the first set of diffraction gratings; and generating a second portion of the uniform-field image from a second portion of the captured image data having angle-dependent information encoded therein by the second set of diffraction gratings; and determining the current lens position information includes: determining first lens position information from a first intensity profile of the first portion of the uniform-field image; determining second lens position information from a second intensity profile of the second portion of the uniform-field image; and determining the current lens position information from the first lens position information and the second lens position information. In some embodiments, the diffraction gratings of the first set and the diffraction gratings of the second set each include a binary phase grating including a series of alternating ridges and grooves extending along a grating axis at a grating period.

In some embodiments, the optical encoder includes an array of microlenses, each microlens covering at least two pixels of the image sensor. In some embodiments, each microlens covers two pixels of the image sensor. In some embodiments, each microlens covers four pixels of the image sensor, the four pixels being arranged in a 2×2 cell.

In some embodiments, the image sensor includes a color filter array interposed between the optical encoder and the array of pixels.

In some embodiments, the computer device is operatively coupled to the imaging lens, and wherein the operations performed by the processor further include: providing a target focus distance at which to set the imaging system; determining a target lens-to-sensor distance between the imaging lens and the image sensor corresponding to the target focus distance; and performing a lens position adjustment operation including one or more iterative cycles, each iterative cycle including; controlling the imaging lens to move with respect to the image sensor based on the target lens-to-sensor distance; controlling the image sensor to capture image data from the scene; performing the operations of receiving the captured image data, generating a uniform-field image from the captured image data, and determining current lens position information, the current lens position information including a current lens-to-sensor distance between the imaging lens and the image sensor; determining whether there is a match between the current lens-to-sensor distance and the target lens-to-sensor distance; if there is a match between the current lens-to-sensor distance and the target lens-to-sensor distance, terminating the lens position adjustment operation and determining that the imaging system has been set at the target focus distance; and if there is not a match between the current lens-to-sensor distance and the target lens-to-sensor distance, performing another iterative cycle.

In accordance with another aspect, there is provided a method of lens position determination in a depth imaging system including an imaging lens, an image sensor, and a transmissive diffractive mask (TDM) interposed between the imaging lens and the image sensor, the method including:

- generating, from pixel data acquired by the image sensor, a uniform-field image representative of a uniform scene viewed through the imaging lens, the uniform-field image having angle-dependent information encoded therein by the TDM; and
- determining, with a processor, lens position information conveying a position of the imaging lens from a profile across the uniform-field image associated with the angle-dependent information.

In accordance with another aspect, there is provided a non-transitory computer readable storage medium having stored thereon computer readable instructions that, when executed by a processor, cause the processor to perform a method of lens position determination in a depth imaging system including an imaging lens, an image sensor, and a transmissive diffractive mask (TDM) interposed between the imaging lens and the image sensor, the method including:

- generating, from pixel data acquired by the image sensor, a uniform-field image representative of a uniform scene viewed through the imaging lens, the uniform-field image having angle-dependent information encoded therein by the TDM; and
- determining lens position information conveying a position of the imaging lens from a profile of the angle-dependent information across the uniform-field image.

In accordance with another aspect, there is provided a depth imaging system including: an imaging lens;

- an image sensor having a plurality of photosensitive pixels configured to detect light transmitted through the imaging lens;
- a transmissive diffractive mask (TDM) interposed between the imaging lens and the image sensor and configured to encode angle-dependent information in the light transmitted through the imaging lens prior to detection of the transmitted light by the plurality of photosensitive pixels; and
- a computer device including a processor and a non-transitory computer readable storage medium having stored thereon computer readable instructions that, when executed by the processor, cause the processor to perform operations, the operations including:
  - generating, from pixel data acquired by the plurality of photosensitive pixels, a uniform-field image representative of a uniform scene viewed through the imaging lens, the uniform-field image having angle-dependent information encoded therein by the TDM; and
  - determining lens position information conveying a position of the imaging lens from a profile of the angle-dependent information across the uniform-field image.

In some embodiments, the lens position information may be used to obtain absolute depth information from relative depth information measured by the depth imaging system.

In some embodiments, the present techniques may be used with an optical encoder different from a TDM to encode angle-dependent information in the light transmitted through the imaging lens prior to detection by the photosensitive pixels. For example, in some embodiments, the optical encoder may be a microlens array interposed between the imaging lens and the image sensor, wherein each microlens of the microlens array may cover two or more photosensitive pixels of the image sensor, and wherein the photosensitive pixels may be configured to operate as phase detection pixels.

Other method and process steps may be performed prior, during or after the steps described herein. The order of one or more steps may also differ, and some of the steps may be omitted, repeated, and/or combined, as the case may be. It is also to be noted that some steps may be performed using various analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 4 also depicts curves of the sum $I_{sum}=I_++I_-$ and the difference $I_{diff}=I_+-I_-$ of the odd and even pixel responses as functions of θ.

FIG. 7 illustrates how the range of angles of incidence at a given pixel of the image sensor can vary with pixel position as a function of the CRA function of the imaging lens and the CRA shifting function between the TDM and the pixels.

DETAILED DESCRIPTION

Figure 1:
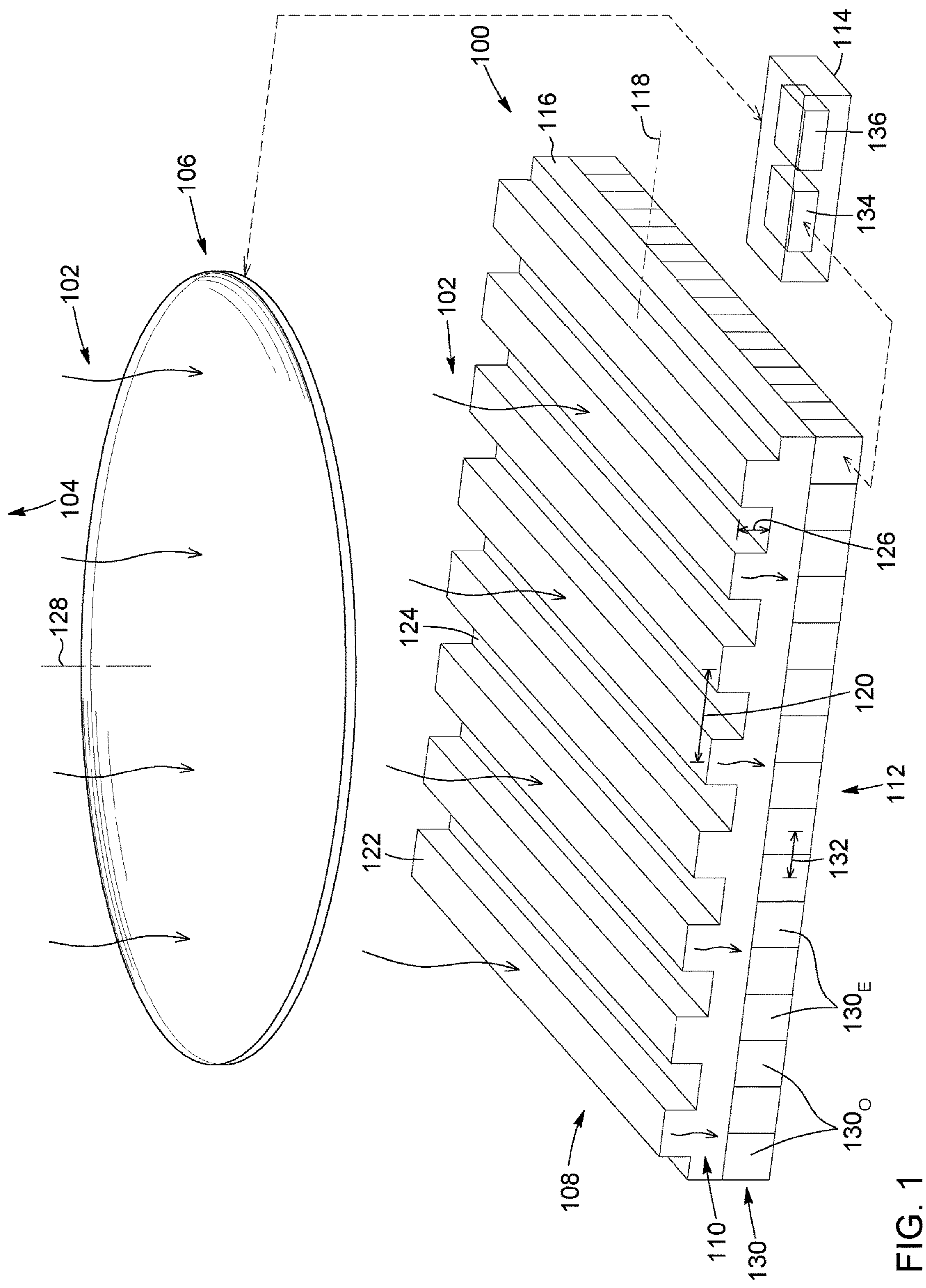
FIG. 1 is a schematic perspective view of a depth imaging system, in accordance with an embodiment.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", "relating to", and the like.

The terms "match", "matching", and "matched" refer herein to a condition in which two elements are either the same or within some predetermined tolerance of each other. That is, these terms are meant to encompass not only "exactly" or "identically" matching the two elements, but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process, but ends after the completion of the second process.

The terms "light" and "optical", and variants and derivatives thereof, refer herein to radiation in any appropriate region of the electromagnetic spectrum. These terms are not limited to visible light, but may also include invisible regions of the electromagnetic spectrum including, without limitation, the terahertz (THz), infrared (IR), and ultraviolet (UV) regions. In some embodiments, the present techniques may be used with electromagnetic radiation having a center wavelength ranging from 175 nanometers (nm) in the deep ultraviolet to about 300 micrometers (μm) in the terahertz range, for example, from about 400 nm at the blue end of the visible spectrum to about 1550 nm at telecommunication wavelengths, or between about 400 nm and about 650 nm to match the spectral range of typical red-green-blue (RGB) color filters. However, these wavelength ranges are provided for illustrative purposes, and that the present techniques may operate beyond these ranges.

The present description generally relates to techniques for lens position determination using depth imaging.

The present techniques may be used in various applications. Non-limiting examples of possible fields of application include, to name a few, consumer electronics (e.g., mobile phones, tablets, laptops, webcams, and notebooks, gaming, virtual and augmented reality, photography), automotive applications (e.g., advanced driver assistance systems, in-cabin monitoring), industrial applications (e.g., inspection, robot guidance, object identification and tracking), and security and surveillance (e.g., motion tracking; traffic monitoring; drones; agricultural inspection with aerial and ground-based drones).

Various aspects and implementations of the present techniques are described below with reference to the figures.

Figure 2:
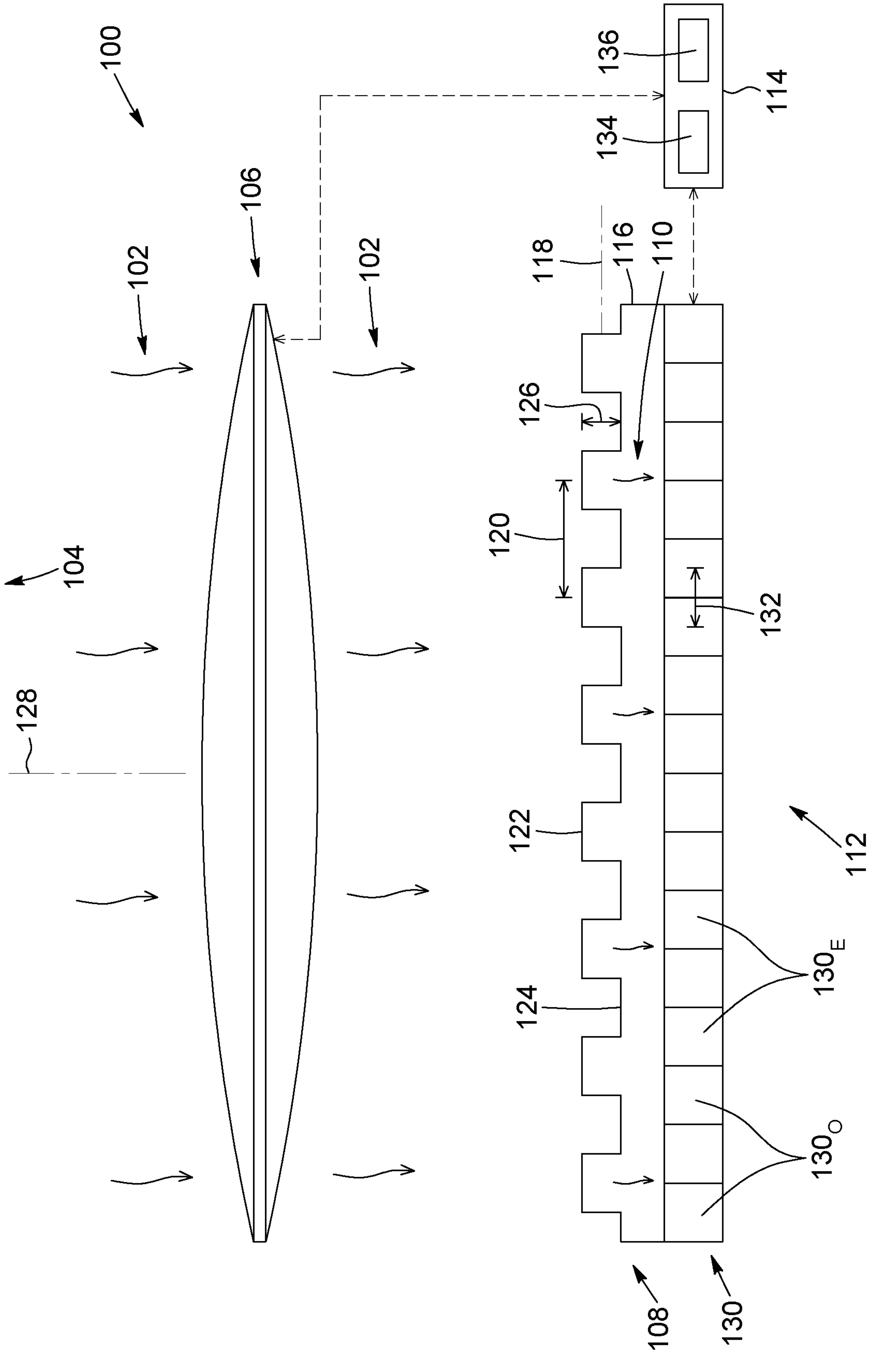
FIG. 2 is a schematic front elevation view of the depth imaging system of FIG. 1.

Referring to FIGS. 1 and 2, there are provided schematic representations of an embodiment of a depth imaging system 100 for capturing image data representative of light 102 received from a scene 104 within a field of view of the imaging system 100. The term "depth imaging system" may be shortened to "imaging system" for simplicity. The captured image data can include depth information about the scene 104. The term "scene" refers herein to any region, space, surface, environment, object, target, or information of interest which may be imaged according to the present techniques.

The depth imaging system 100 illustrated in FIGS. 1 and 2 generally includes an imaging lens 106 configured to receive and transmit the light 102 from the scene 104, an angle-sensitive optical encoder embodied by a transmissive diffraction mask (TDM) 108 configured to diffract the light 102 received from imaging lens 106 to generate diffracted light 110 having encoded therein angle-dependent information about the angle of incidence of the received light 102; an image sensor 112 configured to detect the diffracted light 110 and convert the detected diffracted light 110 into image data; and a computer device 114 configured to process the image data generated by the image sensor 112 to determine the angle-dependent information about the received light 102, from which depth information about the scene 104 may be determined. The structure, configuration, and operation of these and other possible components of the imaging system 100 are described in greater detail below. It is appreciated that FIGS. 1 and 2 are simplified schematic representations that illustrate a number of components of the imaging system 100, such that additional features and components that may be useful or necessary for the practical operation of the imaging system 100 may not be specifically depicted.

The provision of an angle-sensitive optical encoder such as a TDM 108 between the imaging lens 106 and the image sensor 112 can impart the depth imaging system 100 with 3D imaging capabilities, including depth sensing capabilities. This is because the TDM 108 is configured to diffract the light 102 received thereon into diffracted light 110, whose intensity pattern is spatially modulated in accordance with the angle-of-incidence distribution of the received light 102. It is appreciated that the angle-of-incidence distribution of the received light 102 is affected by the passage of the received light 102 through the imaging lens 106. The underlying image sensor 112 is configured to sample, on a per-pixel basis, the intensity pattern of the diffracted light 110 in the near-field to provide image data conveying information indicative of the angle of incidence of the received light 102. The image data may be used or processed in a variety of ways to provide multiple functions including, but not limited to, 3D depth map extraction, 3D surface reconstruction, image refocusing, and the like. Depending on the application, the image data may be acquired as one or more still images or as a video stream.

The structure, configuration, and operation of imaging devices using transmissive diffraction grating structures in front of 2D image sensors to provide 3D imaging capabilities are described in co-assigned international patent applications PCT/CA2017/050686 (published as WO 2017/210781), PCT/CA2018/051554 (published as WO 2019/109182), and PCT/CA2020/050760 (published as WO 2020/243828), as well as in the following master's thesis: Kunnath, Neeth, *Depth from Defocus Using Angle Sensitive Pixels Based on a Transmissive Diffraction Mask* (Master's thesis, McGill University Libraries, 2018). The contents of these four documents are incorporated herein by reference in their entirety. It is appreciated that the theory and applications of such diffraction-based 3D imaging devices are generally known in the art, and need not be described in detail herein other than to facilitate an understanding of the present techniques.

In the embodiment illustrated in FIGS. 1 and 2, the TDM 108 includes a diffraction grating 116 having a grating axis 118 and a grating profile having a grating period 120 along the grating axis 118.

The term "diffraction grating", or simply "grating", refers herein to a structure or material having a spatially modulated optical property and which is configured to spatially modulate the amplitude and/or the phase of an optical wavefront incident thereon. The spatially modulated optical property, for example, a refractive index modulation pattern, defines the grating profile. In some embodiments, a diffraction grating may include a periodic arrangement of diffracting elements, such as alternating ridges and grooves, whose spatial period, the grating period, is substantially equal to or longer than the center wavelength of the optical wavefront incident thereon. Diffraction gratings may also be classified as "amplitude gratings" or "phase gratings", depending on the nature of the diffracting elements. In amplitude gratings, the perturbations to the incident wavefront caused by the grating are the result of a direct amplitude modulation, while in phase gratings, these perturbations are the result of a modulation of the relative group velocity of light caused by a spatial variation of the refractive index of the grating structure or material. In several embodiments disclosed herein, the diffraction gratings are phase gratings, which generally absorb less light than amplitude gratings, although amplitude gratings may be used in other embodiments. In general, a diffraction grating is spectrally dispersive, if only slightly, so that different wavelengths of an incident optical wavefront may be diffracted differently. However, diffraction gratings exhibiting a substantially achromatic response over a certain operating spectral range exist and can be used in some embodiments.

The diffraction grating 116 in FIGS. 1 and 2 is a transmission phase grating, specifically a binary phase grating whose grating profile is a two-level, square-wave function. The diffraction grating 116 has a grating profile along the grating axis 118. The grating profile includes a series of ridges 122 periodically spaced apart at the grating period 120, interleaved with a series of grooves 124 also periodically spaced apart at the grating period 120. In such a case, the grating period 120 corresponds to the sum of the width, along the grating axis 118, of one ridge 122 and one adjacent groove 124. The diffraction grating 116 may also be characterized by a duty cycle, defined as the ratio of the ridge width to the grating period 120, and by a step height 126, defined as the difference in level between the ridges 122 and the grooves 124. The step height 126 may provide a predetermined optical path difference between the ridges 122 and the grooves 124. In some embodiments, the grating period 120 may range between about 0.1 μm and about 20 μm, and the step height 126 may range between about 0.1 μm and about 1 μm, although values outside these ranges can be used in other embodiments. In the illustrated embodiment, the diffraction grating 116 has a duty cycle equal to 50%, but duty cycle values different from 50% may be used in other embodiments. Depending on the application, the grooves 124 may be empty or filled with a material having a refractive index different from that of the ridge material. In the illustrated embodiment, the TDM 108 includes a single diffraction grating, for simplicity. However, TDMs including more than one diffraction grating may be used in other embodiments.

The imaging lens 106 is disposed between the scene 102 and the TDM 108. The imaging lens 106 is configured to receive the light 102 from the scene 104 and focus or otherwise direct the received light 102 onto the TDM 108. The imaging lens 106 can define an optical axis 128 of the imaging system 100. Depending on the application, the imaging lens 106 may include a single lens elements or a plurality of lens elements. In some embodiments, the imaging lens 106 may be a focus-tunable lens assembly. In such a case, the imaging lens 106 may be operated to provide autofocus, zoom, and/or other optical functions.

The image sensor 112 includes an array of photosensitive pixels 130. The pixels 130 are configured to detect electromagnetic radiation incident thereon and convert the detected radiation into electrical signals that can be processed to generate image data conveying information about the scene 104. In the illustrated embodiment, each pixel 130 is configured to detect a corresponding portion of the diffracted light 110 produced by the TDM 108 and generate therefrom a respective pixel response. The pixels 130 may each include a light-sensitive region and associated pixel circuitry for processing signals at the pixel level and communicating with other electronics, such as a readout unit. In general, each pixel 130 may be individually addressed and read out. In the illustrated embodiment, the pixels 130 are arranged in an array of rows and columns defined by two orthogonal pixel axes, although other arrangements may be used in other embodiments. In some embodiments, the image sensor 112 may include hundreds of thousands or millions of pixels 130, for example, from about 1080×1920 to about 6000×8000 pixels. However, many other sensor configurations with different pixel arrangements, aspect ratios, and fewer or more pixels are contemplated. Depending on the application, the pixels 130 of the image sensor 112 may or may not be all identical. In some embodiments, the image sensor 112 is a CMOS or a CCD array imager, although other types of photodetector arrays (e.g., charge injection devices or photodiode arrays) may also be used. The image sensor 112 may operate according to a rolling or a global shutter readout scheme, and may be part of a stacked, backside, or frontside illumination sensor architecture. Furthermore, the image sensor 112 may be implemented using various image sensor architectures and pixel array configurations, and may include various additional components. Non-limiting examples of such additional components include, to name a few, microlenses, color filters, color filter isolation structures, light guides, pixel circuitry, and the like. The structure, configuration, and operation of such possible additional components are generally known in the art and need not be described in detail herein.

In some embodiments, the imaging system 100 may be implemented by adding or coupling the TDM 108 on top of an already existing image sensor 112. For example, the existing image sensor 112 may be a conventional CMOS or CCD imager. In other embodiments, the imaging system 100 may be implemented and integrally packaged as a separate, dedicated, and/or custom-designed device incorporating therein all or most of its hardware components, including the imaging lens 106, the TDM 108, and the image sensor 112. In the embodiment depicted in FIGS. 1 and 2, the TDM 108 extends over the entire pixel array such that all of the pixels 130 detect diffracted light having passed through the TDM 108. However, in other embodiments, the TDM 108 may cover only a portion of the pixel array such that only a subset of the pixels 130 detects diffracted light.

The array of pixels 130 may be characterized by a pixel pitch 132. The term "pixel pitch" refers herein to the center-to-center distance between nearest-neighbor pixels. In some embodiments, the pixel pitch 132 may range between about 0.7 μm and about 10 μm, although other pixel pitch values may be used in other embodiments. The pixel pitch 132 is defined along the grating axis 118. Depending on the application, the pixel pitch 132 may be less than, equal to, or greater than the grating period 120. For example, in the illustrated embodiment, the grating period 120 is twice as large as the pixel pitch 132. However, other grating-period-to-pixel-pitch ratios, R, may be used in other embodiments. Non-limiting examples of possible ratio values include, to name a few, $R \geq 2$; $R=(n+1)$, where n is a positive integer; $R=2n$, where n is a positive integer; $R=1$; $R=2/(2n+1)$, where n is a positive integer, for example, n=1 or 2; and $R=n/m$, where n and m are positive integers larger than two and $m>n$, for example, n=3 and m=4.

In the embodiment illustrated in FIGS. 1 and 2, the diffraction grating 116 is disposed over the image sensor 112 such that the center of each ridge 122 is vertically aligned with the midpoint between adjacent pixels 130, and likewise for the center of each groove 124. Different configurations are possible in other embodiments. For example, as described in greater detail below, the degree of vertical alignment between the TDM 108 and the image sensor 112 may be adjusted in accordance with a chief ray angle (CRA) function or characteristic associated with the imaging lens 106. In such a case, the vertical alignment between the TDM 108 and the image sensor 112 may change as a function of position within the pixel array, for example, as one goes from the center to the edge of the array. This means, for example, that depending on its position within the image sensor 112, a given pixel 130 may be vertically aligned with a center of a ridge 122, a center of a groove 124, a transition between a ridge 122 and a groove 124, or some intermediate position of the corresponding overlying diffraction grating 116.

Referring still to FIGS. 1 and 2, the computer device 114 is operatively coupled to the image sensor 112 to receive therefrom image data about the scene 104. The image data may include a set of pixel responses. The computer device 114 may be configured to determine, from the set of pixel responses, angle-of-incidence information conveying the angle-of-incidence distribution of the received light 102. The computer device 114 may be configured to determine depth information about the scene 104, for example, a depth map, based on the angle-of-incidence information. The computer device 114 may be provided within one or more general purpose computers and/or within any other suitable devices, implemented in hardware, software, firmware, or any combination thereof, and connected to the components of the imaging system 100 via appropriate wired and/or wireless communication links and interfaces. Depending on the application, the computer device 114 may be fully or partly integrated with, or physically from, the image sensor 112. In some embodiments, the computer device 114 may include a distributed and/or cloud computing network. The computer device 114 can include a processor 134 and a memory 136.

The processor 134 can implement operating systems, and may be able to execute computer programs, also known as commands, instructions, functions, processes, software codes, executables, applications, and the like. While the processor 134 is depicted in FIGS. 1 and 2 as a single entity for illustrative purposes, the term "processor" should not be construed as being limited to a single processor, and accordingly, any known processor architecture may be used. In some embodiments, the processor 134 can include a plurality of processing units. Such processing units may be physically located within the same device, or the processor 134 may represent the processing functionalities of a plurality of devices operating in coordination. For example, the processor 134 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 136, which may also be referred to as a "computer readable storage medium" is configured to store computer programs and other data to be retrieved by the processor 134. The terms "computer readable storage medium" and "computer readable memory" refer herein to a non-transitory and tangible computer product that can store and communicate executable instructions for the implementation of various steps of the techniques disclosed herein. The memory 136 may be any computer data storage device or assembly of such devices, including a random-access memory (RAM); a dynamic RAM; a read-only memory (ROM); a magnetic storage device, such as a hard disk drive, a solid state drive, a floppy disk, and a magnetic tape; an optical storage device, such as a compact disc (CD or CDROM), a digital video disc (DVD), and a Blu-Ray™ disc; a flash drive memory; and/or any other non-transitory memory technologies. The memory 136 may be associated with, coupled to, or included in the processor 134, and the processor 134 may be configured to execute instructions contained in a computer program stored in the memory 136 and relating to various functions and operations associated with the processor 134.

Figure 3A:
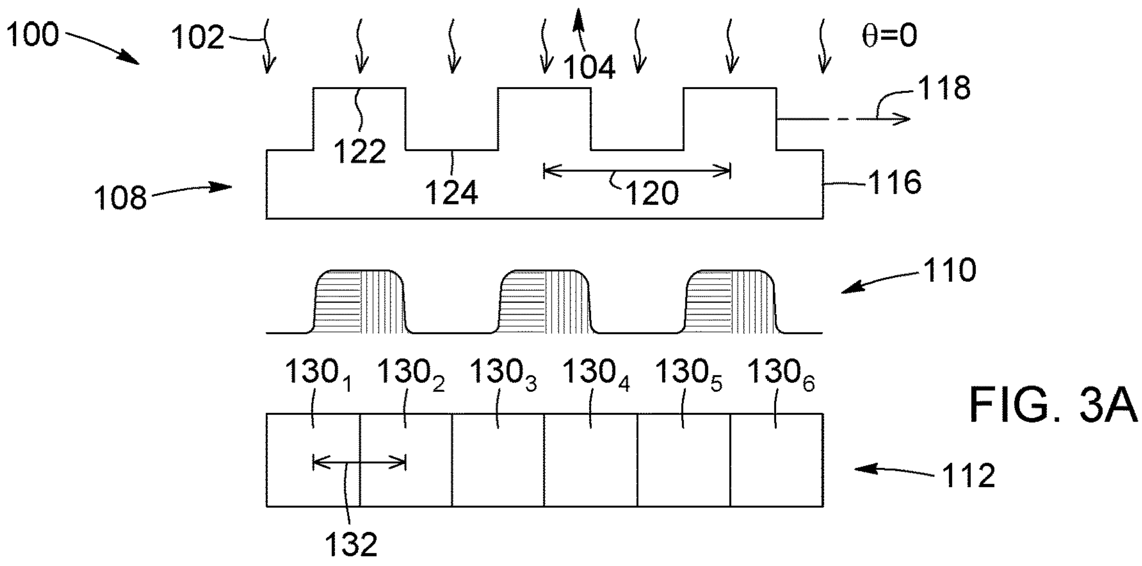
FIGS. 3A to 3C are schematic representations of an example of an imaging system including a transmissive diffractive mask and receiving light with three different angles of incidence θ: normal incidence, θ=0 (FIG. 3A); oblique incidence, $\theta=\theta_{max}>0$ (FIG. 3B); and oblique incidence, $\theta=-\theta_{max}<0$ (FIG. 3C).
Figure 3B:
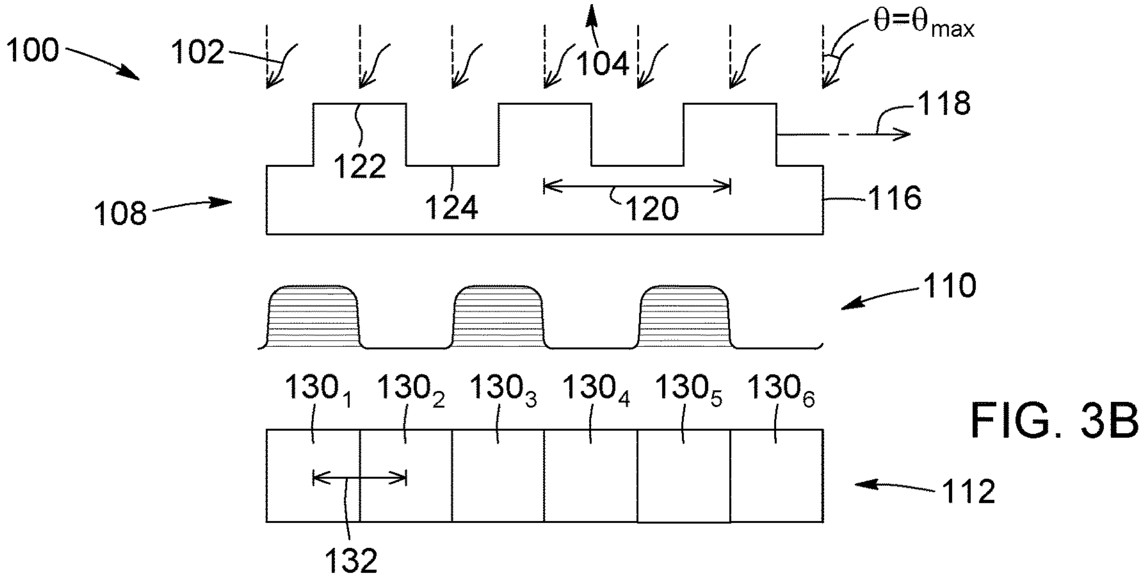
Figure 3C:
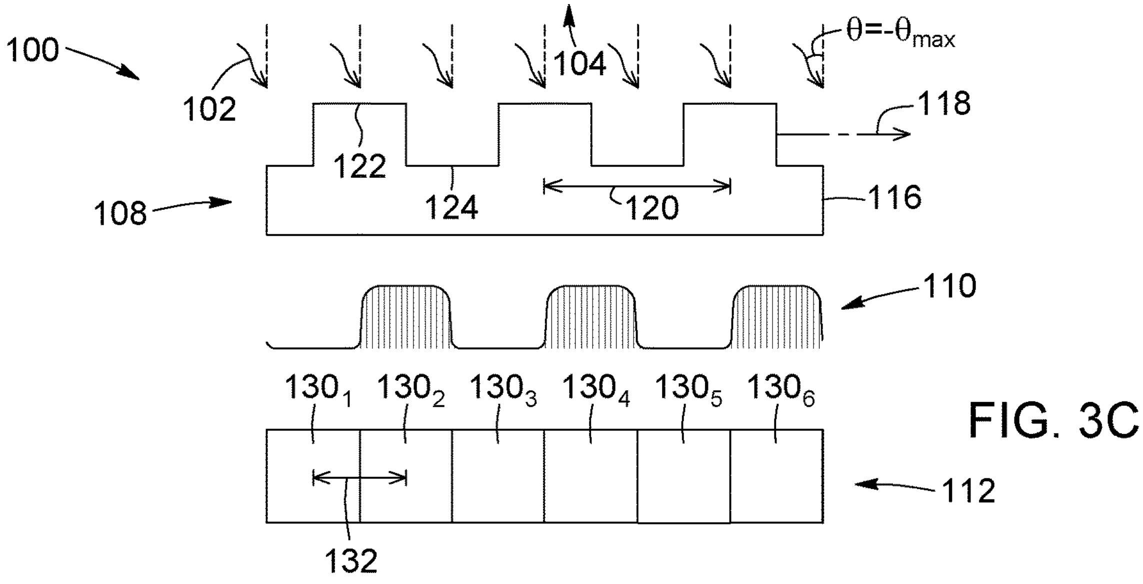

Referring to FIGS. 3A to 3C, the operation of TDM-based imaging systems and how they can be used to provide depth sensing capabilities will be described in greater detail. FIGS. 3A to 3C are schematic representations of an example of a depth imaging system 100 receiving light 102 with three different angles of incidence θ from an observable scene 104 (FIG. 3A: normal incidence, θ=0; FIG. 3B: oblique incidence, $\theta=\theta_{max}>0$; and FIG. 3C: oblique incidence, $\theta=-\theta_{max}<0$). The imaging system 100 includes a TDM 108 and an image sensor 112 disposed under the TDM 108. The TDM 108 includes a binary phase diffraction grating 116 having a grating axis 118 and a grating profile having a grating period 120 and including alternating ridges 122 and grooves 124 with a duty cycle of 50%. The image sensor 112 includes a set of pixels $\mathbf{130}_1$-$\mathbf{130}_6$. The diffraction grating 116 is disposed over the pixels $\mathbf{130}_1$-$\mathbf{130}_6$ such that the center of each ridge 122 is vertically aligned with the midpoint between adjacent ones of the pixels $\mathbf{130}_1$-$\mathbf{130}_6$, and likewise for the center of each groove 124. The grating period 120 is twice as large as the pixel pitch 132.

In operation of the imaging system 100, the diffraction grating 116 receives the light 102 from the scene 104 on its input side, and diffracts the received light 102 to generate, on its output side, diffracted light 110 that travels toward the image sensor 112 for detection by the pixels $\mathbf{130}_1$-$\mathbf{130}_6$. The diffracted light 110 has an intensity pattern that is spatially modulated based, inter alfa, on the geometrical and optical properties of the diffraction grating 116, the angle of incidence θ of the received light 102, and the position of the observation plane (e.g., the image sensor 112, or an intermediate optical component, such as a microlens array, configured to relay the diffracted light 110 onto the pixels $\mathbf{130}_1$-$\mathbf{130}_6$). In the example illustrated in FIGS. 3A to 3C, the observation plane corresponds to the light-receiving surface of the image sensor 112. The TDM 108 and the image sensor 112 are disposed relative to each other such that the light-receiving surface of the image sensor 112 is positioned in the near-field diffraction region of the diffraction grating 116. For example, in order to detect the diffracted light 110 in the near-field, the separation distance between the grating profile of the diffraction grating 116, where the diffracted light 110 is formed, and the light-receiving surface of the image sensor 112, where the diffracted light 110 is detected, may range between about 0.2 μm and about 20 μm, such as between about 0.5 μm and about 8 μm if the center wavelength of the received light 102 is in the visible range.

The Talbot effect is a near-field diffraction effect in which plane waves incident on a periodic structure, such as a diffraction grating, produce self-images of the periodic structure at regular distances behind the periodic structure. The self-images can be referred to as Talbot images. The main distance at which self-images of the periodic structure are observed due to interference is called the Talbot length $z_T$. In the case of a diffraction grating having a grating period g, the Talbot length $z_T$ may be expressed as follows: $z_T=\lambda/[1-(1-\lambda^2/g^2)^{1/2}]$, where λ is the wavelength of the light incident on the grating. This expression simplifies to $z_T=2g^2/\lambda$ when g is sufficiently large compared to λ. Other self-images are observed at integer multiples of the half Talbot length, that is, at $nz_T/2$. These additional self-images are either in-phase (if n is even) and out-of-phase by half of the grating period (if n is odd) with respect to the self-image observed at $z_T$. Further sub-images with smaller periods can also be observed at smaller fractional values of the Talbot length. These self-images are observed in the case of amplitude gratings.

In the case of phase gratings, such as the one depicted in FIGS. 3A to 3C, it is the phase of the grating that is self-imaged at integer multiples of the half-Talbot length, which cannot be observed using intensity-sensitive photodetectors, such as photodiodes. As such, a phase grating, unlike an amplitude grating, produces a diffracted wavefront of substantially constant light intensity in an observation plane located at integer multiples of the half-Talbot length. However, phase gratings may also be used to generate near-field intensity patterns similar to Talbot self-images at intermediate observation planes that are shifted from the planes located at integer multiples of the half-Talbot length. For example, such intermediate observation planes may be located at $z_T/4$ and $3z_T/4$. These intensity patterns, which are sometimes referred to as Lohmann images, can be detected with intensity-sensitive photodetectors.

In the example illustrated in FIGS. 3A to 3C, the diffraction grating 116 and the image sensor 112 are positioned relative to each other so as to detect these Talbot-like, near-field intensity patterns formed at observation planes corresponding to non-integer multiples of the half-Talbot length (i.e. Lohman images), for example, at $z_T/4$ or $3z_T/4$. In such a case, the diffraction grating 116 is configured to generate, in the observation plane, diffracted light 110 having an intensity pattern that is spatially modulated according to the grating period 120. As depicted in FIGS. 3A to 3C, the intensity pattern of the diffracted light 110 has a spatial period that matches or relates to the grating period 120 and a shape that matches or relates to the grating profile. In FIGS. 3A to 3C, the spatial period of the intensity pattern of the diffracted light 110 is substantially equal to the grating period 120. However, in other embodiments, the spatial period of the intensity pattern of the diffracted light 110 may be a rational fraction of the grating period 120, such as half the grating period 120 in the case of doubled Lohmann images. Each of the pixels $\mathbf{130}_1$-$\mathbf{130}_6$ of the image sensor 112 is configured to sample a respective portion of the intensity pattern of the diffracted light 110 and to generate therefrom a corresponding intensity-based pixel response. In FIGS. 3A to 3C, the horizontally hatched portions of the intensity pattern of the diffracted light 110 are sampled by the odd pixels $\mathbf{130}_1$, $\mathbf{130}_3$, $\mathbf{130}_5$, while the vertically hatched portions are sampled by the even pixels $\mathbf{130}_2$, $\mathbf{130}_4$, $\mathbf{130}_6$.

Another property of Lohmann self-images is that they shift laterally along the grating axis 118 upon varying the angle of incidence θ of the received light 102, while substantially retaining their period and shape. This can be seen from a comparison between the intensity pattern of the diffracted light 110 illustrated in FIGS. 3A to 3C. The diffraction grating 116 is configured to impart an asymmetric angle-dependent spatial modulation to the intensity pattern of the diffracted light 110, which is sampled by the pixels $\mathbf{130}_1$-$\mathbf{130}_6$. By controlling the vertical alignment between the diffraction grating 116 and the image sensor 112 and the relationship between the grating period 120 and the pixel pitch 132, the intensities measured by the individual pixels $\mathbf{130}_1$-$\mathbf{130}_6$ for a given intensity of the received light 102 will vary as a function of the angle of incidence θ due to the lateral shifts experienced by the diffracted light 110. For example, in FIGS. 3A to 3C, the intensities measured by the odd pixels $\mathbf{130}_1$, $\mathbf{130}_3$, $\mathbf{130}_5$ are respectively equal to (FIG. 3A), greater than (FIG. 3B), and less than (FIG. 3C) the intensities measured by the even pixels $\mathbf{130}_2$, $\mathbf{130}_4$, $\mathbf{130}_6$. The angle-dependent information encoded by the diffraction grating 116 into the intensity pattern of the diffracted light 110 recorded by the image sensor 112 as a set of individual intensity-based pixel responses can be extracted, decoded, or otherwise retrieved to provide depth information about the scene 104.

Figure 4:
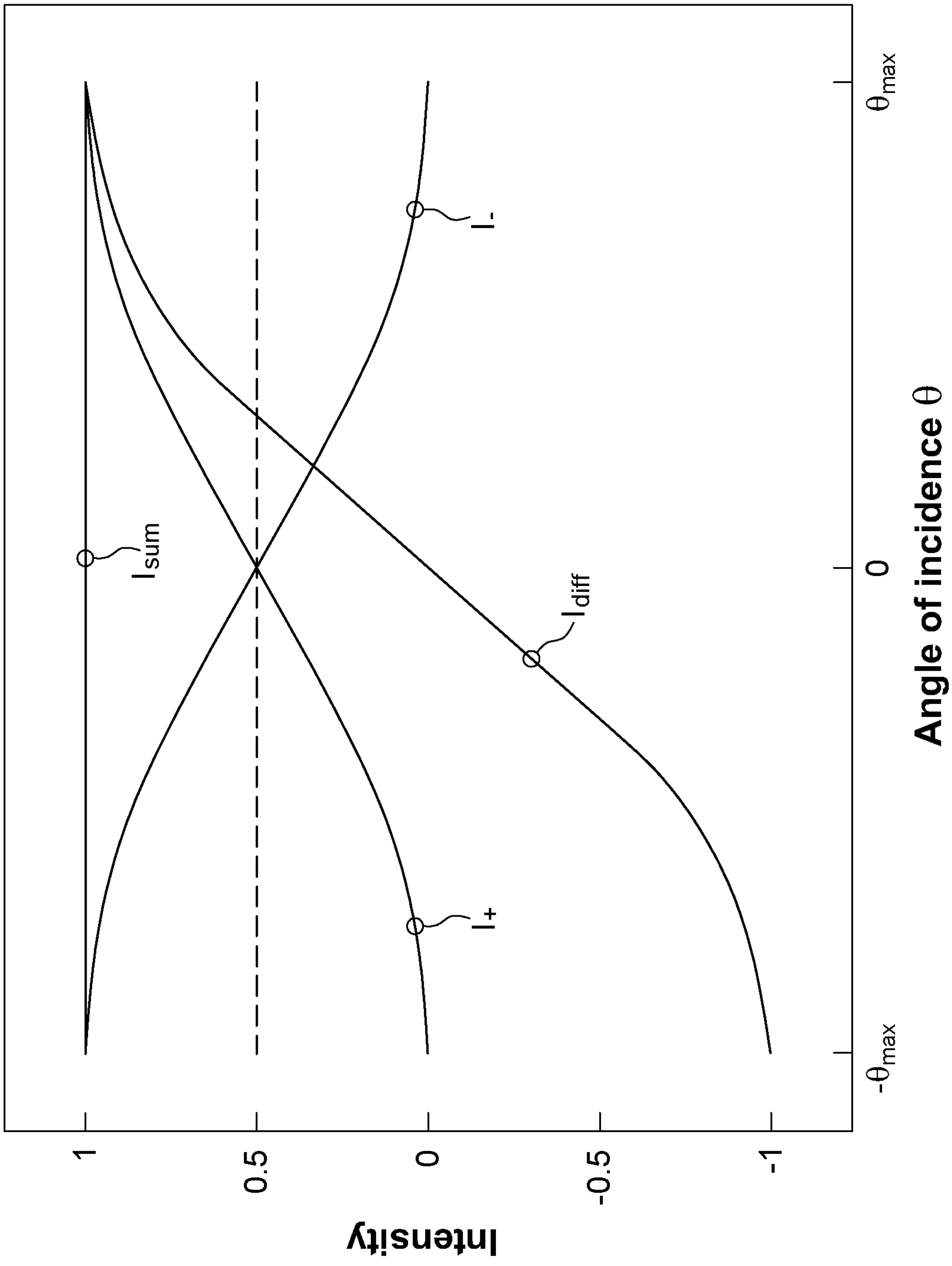
FIG. 4 is a graph depicting curves of the individual pixel responses of the odd pixels ($I_+$) and the even pixels ($I_-$) of the imaging system illustrated in FIGS. 3A to 3C, plotted as functions of the angle of incidence θ, for a given intensity of incident light.

Referring to FIG. 4, there are depicted curves of the individual pixel responses of the odd pixels $\mathbf{130}_1$, $\mathbf{130}_3$, $\mathbf{130}_5$ ($I_+$) and the even pixels $\mathbf{130}_2$, $\mathbf{130}_4$, $\mathbf{130}_6$ ($I_-$) of FIGS. 3A to 3C, plotted as functions of the angle of incidence θ, for a given intensity of incident light. FIG. 4 assumes that the intensity of the incident light is equal to one and that there is a modulation depth of substantially 100% between $\theta=\pm\theta_{max}$, where the maxima of the diffracted intensity pattern are centered on either the odd pixels $\mathbf{130}_1$, $\mathbf{130}_3$, $\mathbf{130}_5$ or the even pixels $\mathbf{130}_2$, $\mathbf{130}_4$, $\mathbf{130}_6$ (peak modulated level), and θ=0, where the maxima of the diffracted intensity pattern are centered on the transitions between the odd pixels $\mathbf{130}_1$, $\mathbf{130}_3$, $\mathbf{130}_5$ or the even pixels $\mathbf{130}_2$, $\mathbf{130}_4$, $\mathbf{130}_6$ (unmodulated level). It is seen that $I_+$ and $I_-$ have complementary asymmetrical angular responses, where $I_+$ and $I_-$ are mirror functions of each other with respect to the unmodulated level axis (dashed line in FIG. 4) and where $I_+$ and $I_-$ respectively increases and decreases as θ increases. FIG. 4 also depicts curves of the sum $I_{sum}=I_++I_-$ and the difference $I_{diff}=I_+-I_-$ of the odd and even pixel responses as functions of θ.

It is appreciated that since the intensities $I_+$ and $I_-$ vary in a complementary way as a function of θ, their sum $I_{sum}$ remains, in principle, independent of θ. In practice, $I_{sum}$ can be controlled to remain largely independent of θ, or at least symmetrical with respect to θ (i.e., so that $I_{sum}(\theta)=I_{sum}(-\theta)$. The summed pixel response, $I_{sum}$, is similar to the signal that would be obtained by the pixels $\mathbf{130}_1$-$\mathbf{130}_6$ in the absence of the diffraction grating 116, and thus can provide 2D intensity image information, with no or little angle-dependent information encoded therein. The differential pixel response, $I_{diff}$, varies asymmetrically as a function of θ and represents a measurement of the angle-of-incidence information encoded into the diffracted light 110 by the diffraction grating 116. The pixel responses $I_+$, $I_-$, $I_{sum}$, and $I_{diff}$ may be expressed mathematically as follows:

$$I_{\pm}(\theta) = \frac{I_0}{2}[1 \pm m\sin(\beta\theta)], \tag{1}$$

$$I_{sum} = I_0, \tag{2}$$

$$I_{diff}(\theta) = I_0\, m\sin(\beta\theta), \tag{3}$$

where $I_0$ is the intensity of the incident light, m is a modulation depth parameter, and β is an angular sensitivity parameter. For example, in FIG. 4, $I_0=1$, m=1, and $\beta=1/\theta_{max}$. It is noted that the expressions for the intensity-based pixel responses $I_+$ and $I_-$ in Equation (1) are not exact relationships. However, they can provide convenient analytical expressions that are adequately representative of how $I_+$ and $I_-$ may vary as a function of the angle of incidence.

Equations (2) and (3) imply that each summed pixel response $I_{sum}$ is obtained by summing one odd pixel response $I_+$ and one even pixel response $I_-$, and that each differential pixel response $I_{diff}$ is obtained by subtracting one even pixel response $I_-$ from one odd pixel response $I_+$. Such an approach may be viewed as a 2×1 binning mode. However, other approaches can be used to determine summed and differential pixel responses $I_{sum}$ and $I_{diff}$, for example, a 2×2 binning mode (e.g., $I_{sum}=I_{1+}+I_{1-}+I_{2+}+I_{2-}$ and $I_{diff}=I_{1+}-I_{1-}+I_{2+}-I_{2-}$, where $I_{1\pm}$ is a first pair of odd and even pixel responses and $I_{2\pm}$ is an adjacent second pair of odd and even pixel responses), or a convolution mode (e.g., using a kernel such that $I_{sum}$ and $I_{diff}$ have the same pixel resolution as $I_+$ and $I_-$). In this regard, the term "differential" is used herein to denote not only a simple subtraction between two pixel responses, but also a more complex differential operation from which a difference between two or more pixel responses is obtained. Furthermore, although the example of FIGS. 3A to 3C defines two groups of pixels 130 with different pixel responses as a function of the angle of incidence (i.e., the odd pixels $\mathbf{130}_1$, $\mathbf{130}_3$, $\mathbf{130}_5$ and the even pixels $\mathbf{130}_2$, $\mathbf{130}_4$, $\mathbf{130}_6$), other embodiments may define groups composed of more than two pixels with different angular responses.

The summed and differential pixel responses, $I_{sum}$ and $I_{diff}$, may be processed to provide depth information about the scene 104. In some embodiments, the summed and differential pixel responses $I_{sum}$ and $I_{diff}$ from all the odd-even pixel pairs or groups may be used to provide a TDM disparity map. The TDM disparity map is made of a set of TDM disparities, $d_{TDM}$, one for each odd-even pixel pair or group (or TDM pixel pair or group). The TDM disparity map is representative of the difference between the viewpoint of the scene 104 provided by the odd pixels $\mathbf{130}_1$, $\mathbf{130}_3$, $\mathbf{130}_5$ and the viewpoint of the scene 104 provided by the even pixels $130_2$, $130_4$, $130_6$. Stated otherwise, the odd pixel responses $I_+$ and the even pixel responses $I_-$ can provide two slightly different views of the scene 104, separated by an effective TDM baseline distance corresponding to the distance between the odd and even pixels of each pair. The TDM disparity map can be processed to generate a depth map of the scene 104.

Returning to FIGS. 1 and 2, the pixels 130 of the image sensor 112 can be said to include odd pixels $130_O$ and even pixels $130_E$, which are respectively designated by the letters "O" and "E" in FIGS. 1 and 2. The odd pixels $130_O$ and the even pixels $130_E$ are configured to sample complementary portions of the diffracted light 110 over a full period thereof. The pixel responses of the odd pixels $130_O$, $I_+$, and the pixel responses of the even pixels $130_E$, $I_-$, may be described by Equation (1). Using Equations (2) and (3), the odd and even pixel responses and $I_+$ and $I_-$ can be used to compute a set of summed pixel responses, $I_{sum}$, and a set of differential pixel responses, $I_{diff}$, respectively. The computer device 114 may be configured to determine depth information about the scene 104 from the set of summed pixel responses $I_{sum}$ and the set of differential pixel responses $I_{diff}$, for example, by computing a set of TDM disparities $d_{TDM}$ and obtaining therefrom a TDM disparity map.

Figure 5:
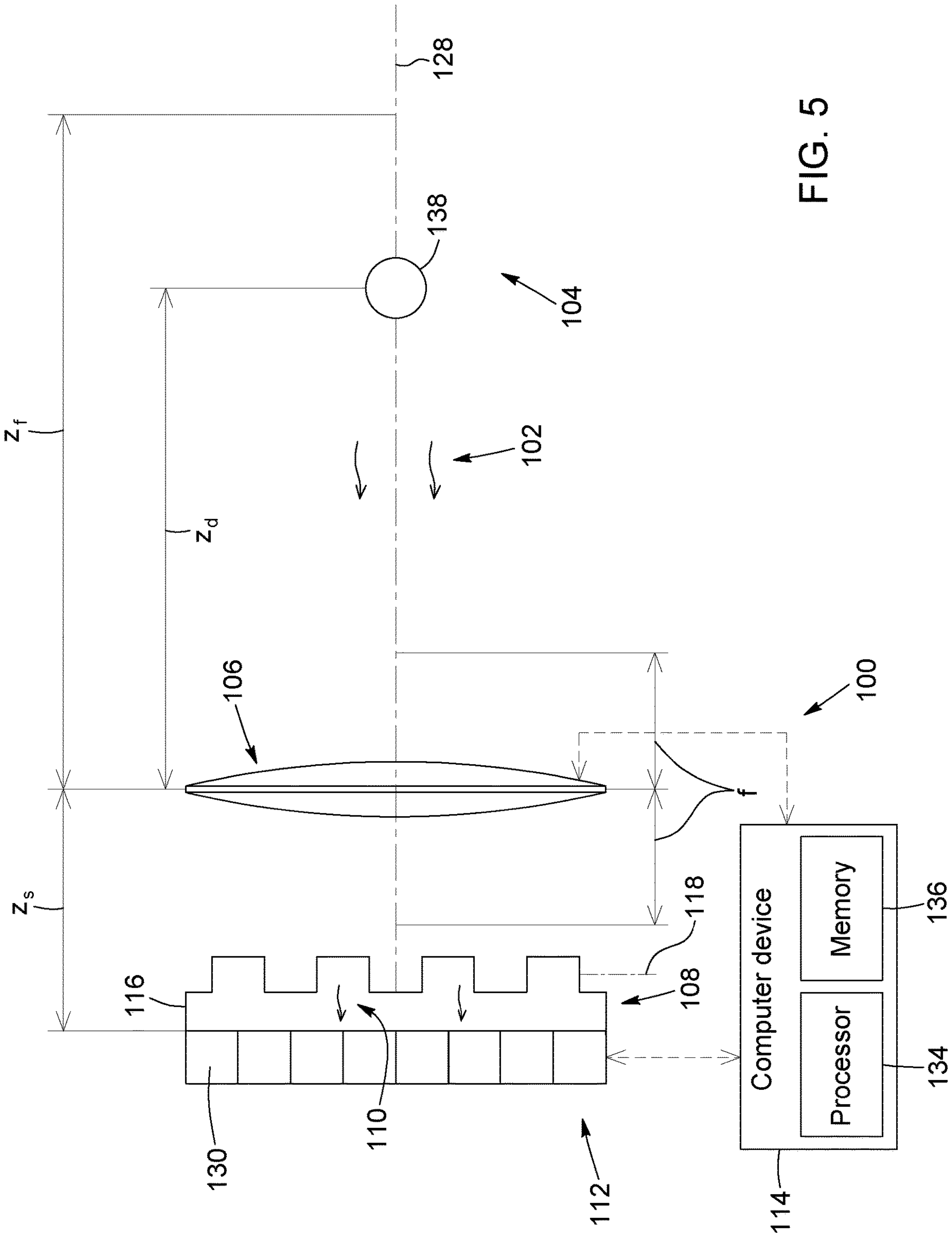
FIG. 5 is a schematic side view of a depth imaging system, in accordance with another embodiment.

The TDM disparity $d_{TDM}$ conveys relative depth information about the scene 102 but generally does not directly provide absolute depth information. Referring to FIG. 5, there is provided a schematic representation of an embodiment of a depth imaging system 100 for capturing image data representative of light 102 received from a scene 104. The imaging system 100 generally includes an imaging lens 106, a TDM 108, an image sensor 112, and a computer device 114. The structure, configuration, and operation of these components can be similar to those described above with respect to FIGS. 1 and 2.

In some embodiments, the absolute depth, $z_d$, of an object 138 in a scene 104 can be related to the TDM disparity $d_{TDM}$ as follows:

$$d_{TDM} = S_{TDM}\left(\frac{1}{z_d} - \frac{1}{z_f}\right), \quad (4)$$

where $S_{TDM}$ is a depth sensitivity parameter associated with the TDM 108, and $z_f$ is the focus distance of the imaging system 100. It is appreciated that Equation (4) relates relative depth information contained in $d_{TDM}$ to absolute depth information contained in $z_d$. The depth sensitivity parameter $S_{TDM}$ can depend on various factors including, but not limited to, different parameters of the imaging lens 106 (e.g., focal length, f-number, optical aberrations), the shape and amplitude of the angular response of the TDM 108, the size of the pixels 130, and the wavelength and polarization of the incoming light 102. The depth sensitive parameter $S_{TDM}$ may be determined by calibration. The focus distance $z_f$ is the distance along the optical axis 128 computed from the center of the imaging lens 106 to the focus plane, which is the object plane that is imaged in-focus at the sensor plane of the image sensor 112. The sensor plane is at a distance $z_s$, from the center of the imaging lens 106. The focus distance $z_f$ and the lens-to-sensor distance $z_s$, may be related by the thin-lens equation as follows:

$$\frac{1}{f} = \frac{1}{z_s} + \frac{1}{z_f}, \quad (5)$$

where f is the focal length of the imaging lens 106. In some embodiments, the focal length f may range from about 1 mm to about 50 mm, the lens-to-sensor distance $z_s$ may range from about 1 mm to about 50 mm, and the focus distance $z_f$ may range from about 1 cm to infinity. In some embodiments, the lens-to-sensor distance $z_s$ may be slightly longer than the focal length f, and the focus distance $z_f$ may be significantly longer than both the focal length f and the lens-to-sensor distance $z_s$.

Figure 6:
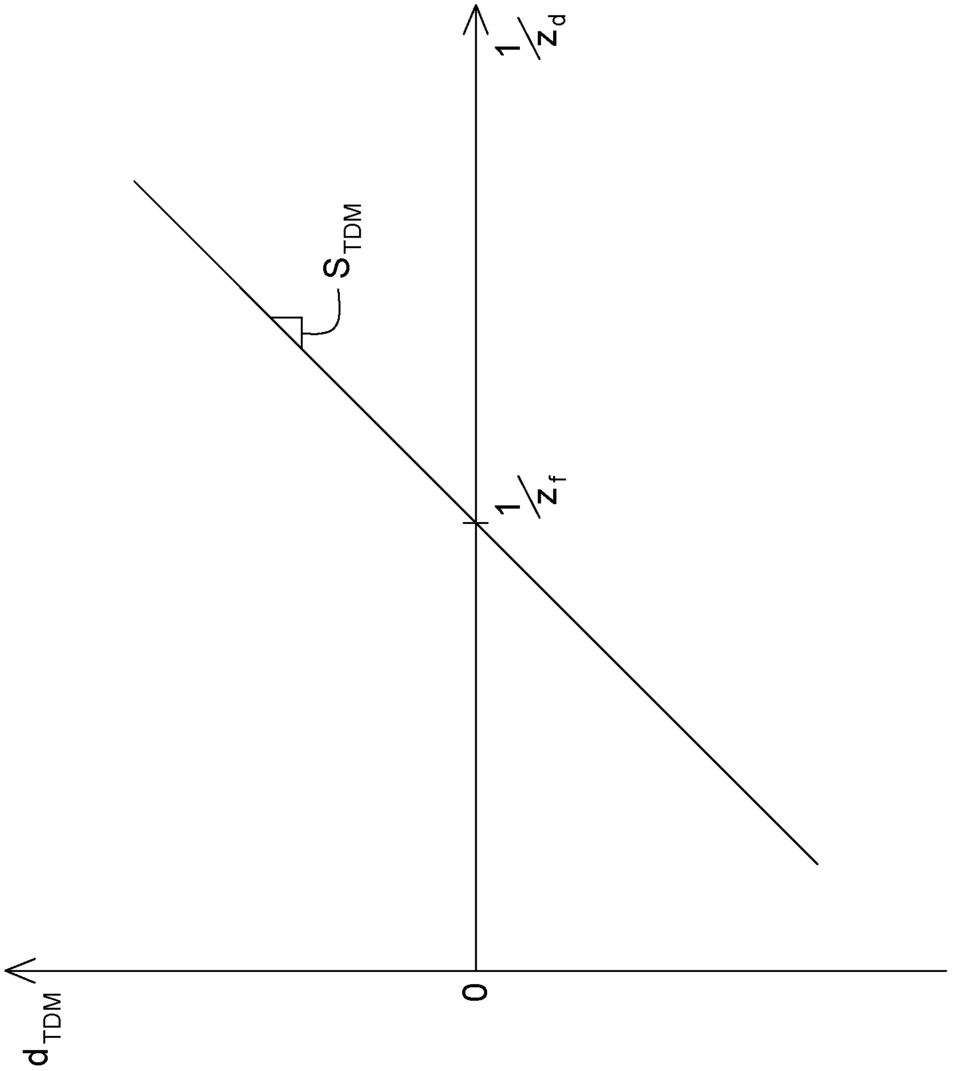
FIG. 6 is a graph depicting a curve of disparity plotted as a function of the inverse of object distance, which can be obtained using a TDM-based imaging system such as disclosed herein.

FIG. 6 is graph depicting a curve of the TDM disparity $d_{TDM}$ given by Equation (4) and plotted as a function of the inverse of the object distance, $1/z_d$. It is seen that $d_{TDM}$ is linearly proportional to $1/z_d$, with a slope of $S_{TDM}$, and equal to zero when $z_d = z_f$. Also, the larger magnitude of $d_{TDM}$, the farther the object 138 is from the focus plane at $z_f$. It is appreciated that, in practice, the curve of $d_{TDM}$ versus $1/z_d$ may deviate from the ideal curve depicted FIG. 6, for example, by following a non-strictly linear profile. In operation, the TDM disparity $d_{TDM}$ may be derived from pixel response measurements and used to determine the object distance $z_d$ by comparison with calibration data relating $d_{TDM}$ to $z_d$ over a certain range of object distances for one or more values of focus distance $z_f$. The calibration data may include calibration curves and lookup tables.

It is appreciated that an accurate determination of the object distance $z_d$ from the TDM disparity $d_{TDM}$ assumes that the focus distance $z_f$, and thus the lens-to-sensor distance $z_s$, is or can be known in a precise manner. If this is not case, the accuracy of depth determination may be degraded or otherwise adversely impacted, the impact being generally more important at larger values of $z_d$. This means that a calibration curve of $d_{TDM}$ versus $1/z_d$ can provide reliable depth determination only if the position of the imaging lens 106 has remained unchanged since calibration or, if the position of the imaging lens 106 has changed since calibration, that its current value can be known accurately to update the calibration curve. Such changes in the position of the imaging lens 106 may be intentional (e.g., changes during autofocus operations) or unintentional (e.g., changes due to wear or other factors causing drifts over time in lens position). It has been found that both intentional and unintentional lens position changes in TDM-based imaging systems may be difficult to ascertain in a reliable way, which may adversely affect the accuracy of absolute depth estimates obtained from relative depth information (e.g., the TDM disparity $d_{TDM}$) derived from optical measurements (e.g., the pixel responses $1_\pm$). The capability of knowing or adjusting the lens-to-sensor distance $z_s$, in a precise manner is also relevant in applications that involve adjusting the focus distance $z_f$ of the imaging system 100 to a target or desired value. This is because adjusting the focus distance $z_f$ generally involves moving the imaging lens 106 with respect to the image sensor 106 to a lens-to-sensor distance $z_s$ that corresponds to the target value of the focus distance $z_f$, for example, using Equation (5).

Figure 7:
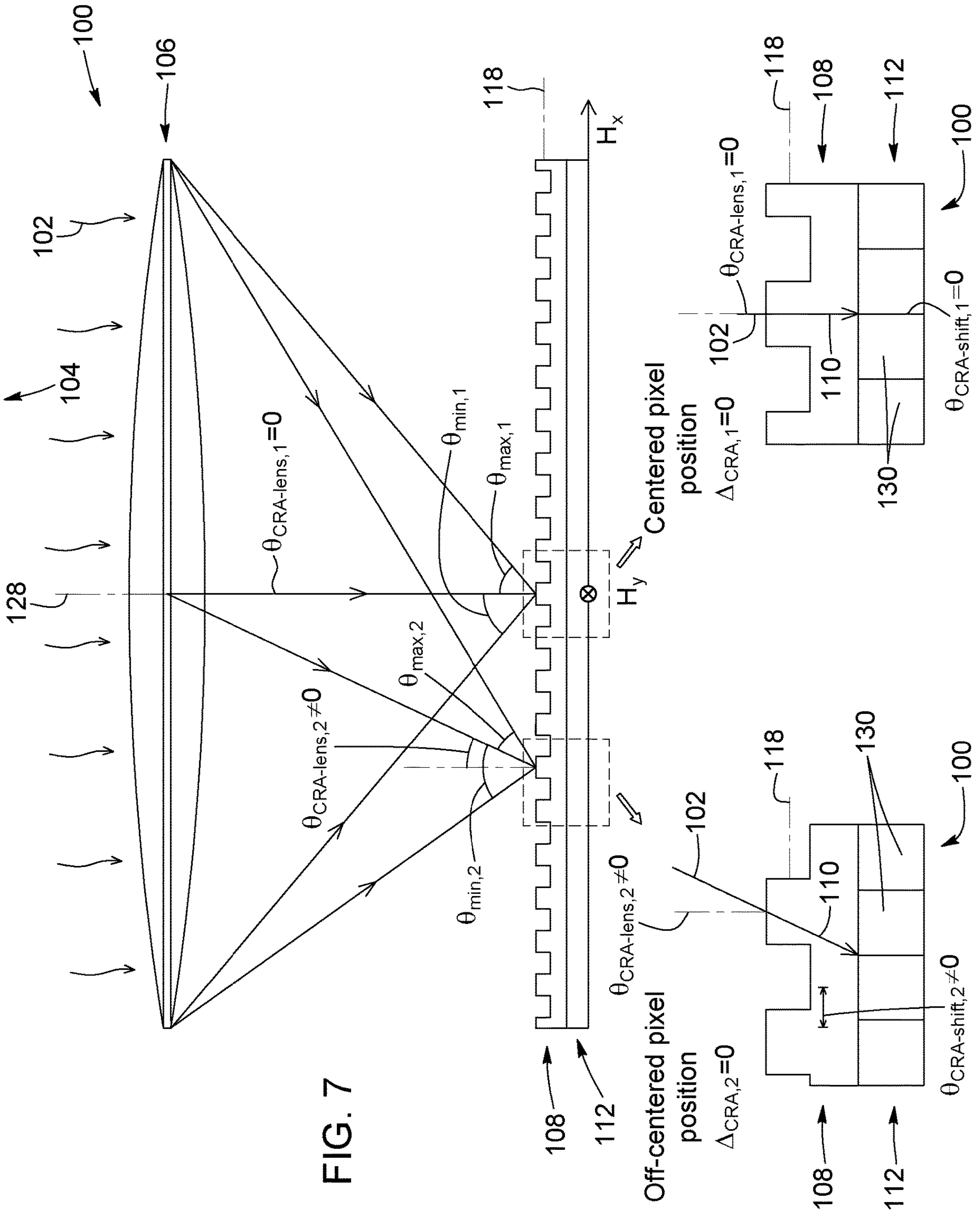
FIG. 7 is a schematic perspective view of a depth imaging system, in accordance with an embodiment.

It is appreciated that Equations (1) to (3) introduced above are defined for one particular angle of incidence. However, in practice, each pixel receives light from a cone of angles of incidence. Referring to FIG. 7, in the case of a single grating orientation, the relevant range of angles of incidence is one-dimensional in a plane of incidence that contains the grating axis 118 of the TDM 108 and the optical axis 128 of the imaging lens 106. In the case of uniform illumination of the imaging lens 106, the intensity value $i_\pm$ measured at an odd ($i_+$) or even ($i_-$) pixel 130 located at pixel position or image height ($H_x$, $H_y$) can be written as follows:

$$i_\pm(H_x, H_y) = \int_{-\theta_{min}}^{\theta_{max}} I_\pm(\theta + \theta_{CRA-lens} - \theta_{CRA-shift})d\theta = \int_{-\theta_{min}}^{\theta_{max}} I_\pm(\theta + \Delta_{CRA})d\theta, \quad (06)$$

where $\theta_{CRA-lens}$ is the CRA function of the imaging lens 106, $\theta_{CRA-shift}$ is a CRA shifting or correction function, if any, applied by laterally shifting the TDM 108 relative to the pixels 130 along the grating axis 118 as compared to their relative alignment at pixel positions where $\theta_{CRA-lens}$=0, and $\Delta_{CRA}=\theta_{CRA-lens}-\theta_{CRA-shift}$ is the CRA mismatch. In Equation (6), the variable θ and, thus, the integral bounds $-\theta_{min}$ and $\theta_{max}$ are defined with respect to $\theta_{CRA-lens}$, where $\theta_{max}$ and $\theta_{min}$ are positive numbers. The terms $\theta_{CRA-lens}$, $\theta_{CRA-shift}$, $\theta_{min}$, and $\theta_{max}$ all depend on pixel position ($H_x$, $H_y$) but that this dependence is made implicit in Equation (6) to simplify the notation. Typically, $\theta_{CRA-lens}$ is zero at the center of the array and increases, linearly or nonlinearly, toward the edge of the array. This is illustrated in FIG. 7, where $\theta_{CRA-lens}$=0 at a centered pixel position with $H_x$=0 and $\theta_{CRA-lens}\neq0$ at an off-centered pixel position with $H_x\neq0$.

The CRA shifting function $\theta_{CRA-shift}$ may be selected so as to substantially match the lens CRA function $\theta_{CRA-lens}$ across the image sensor 112 in order to reduce the CRA mismatch $\Delta_{CRA}$ and adverse effects associated therewith. For example, the CRA mismatch $\Delta_{CRA}$ is equal to zero at both the centered and off-centered pixel positions depicted in FIG. 7. However, this is not a requirement and the CRA mismatch $\Delta_{CRA}$ need not be equal to zero everywhere across the pixel array. Furthermore, in some embodiments, the CRA mismatch correction accounted for by the term $\theta_{CRA-shift}$ may be provided additionally or alternatively by a microlens array shift and/or a color filter array shift. The theory and applications of microlens and color filter arrays shifts for CRA mismatch adjustment are generally known in the art, and need not be described in detail herein other than to facilitate an understanding of the techniques disclosed herein. The angles $\theta_{min}$ and $\theta_{max}$ depend on the aperture size of the imaging lens 106 and their values vary across the pixel array, as illustrated in FIG. 7, where the angles $\theta_{min,1}$ and $\theta_{max,1}$ associated with the centered pixel position are different from the angles $\theta_{min,2}$ and $\theta_{max,2}$ associated with the off-centered pixel position.

Figure 8A:
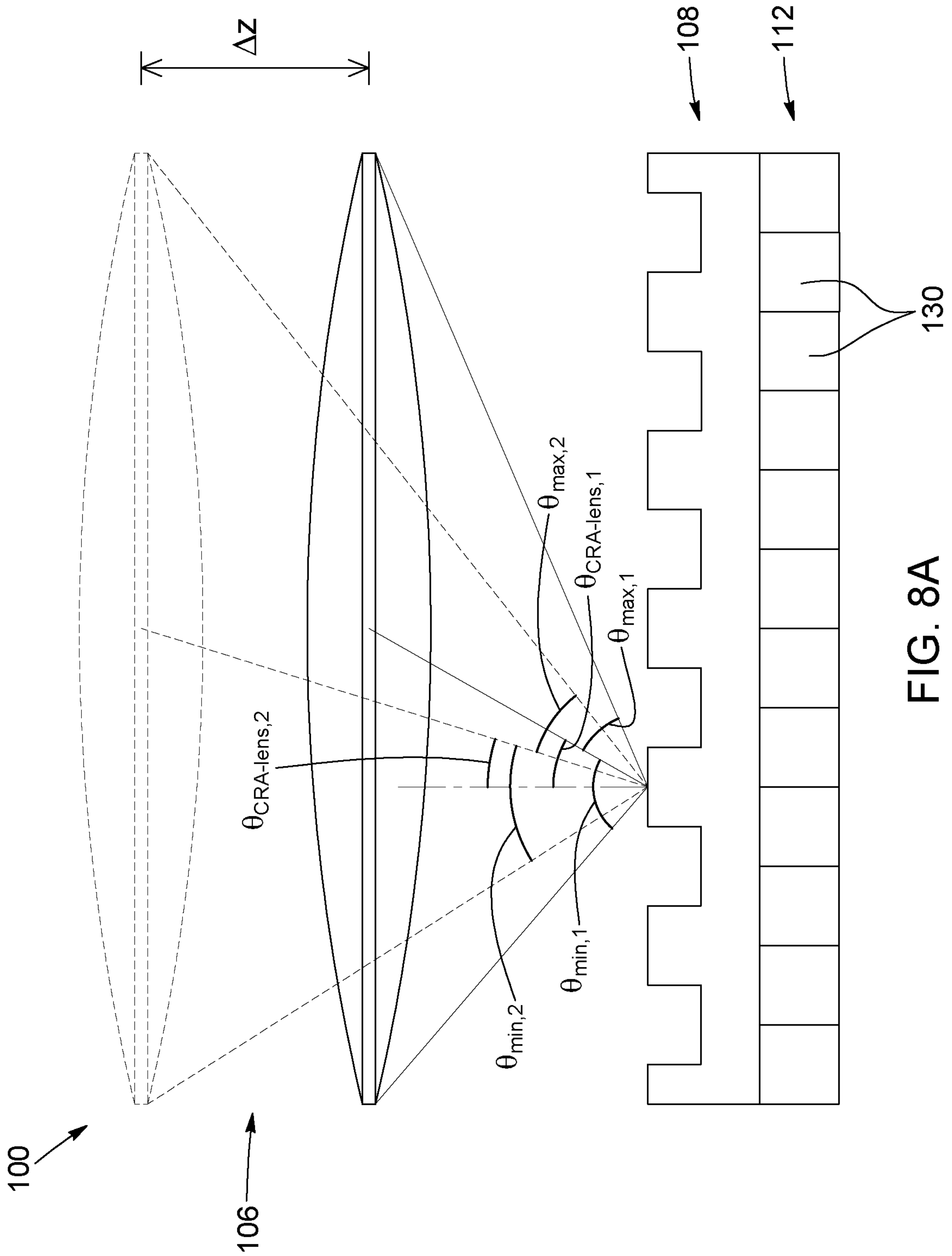
FIGS. 8A to 8C illustrates how the CRA function $\Theta_{CRA\text{-}lens}$ of the imaging lens and the ranges of angles of incidence $[-\theta_{min}, \theta_{max}]$ at a given pixel of the image sensor can vary as a result of applying an axial shift Δz (FIG. 8A), a lateral shift Δx (FIG. 8B), and a tilt $\Delta\varphi_x$ (FIG. 8C) to the imaging lens.
Figure 8B:
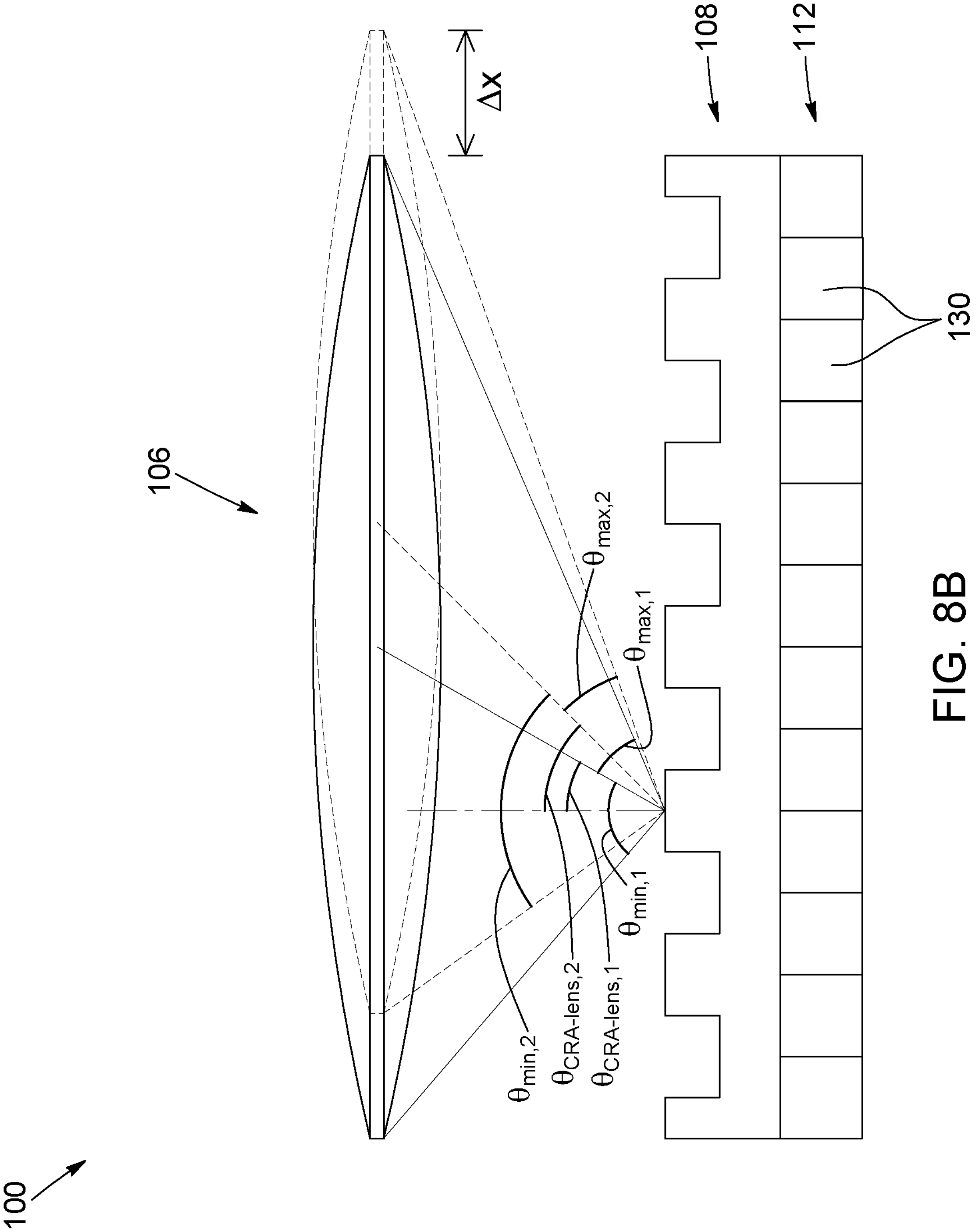
Figure 8C:
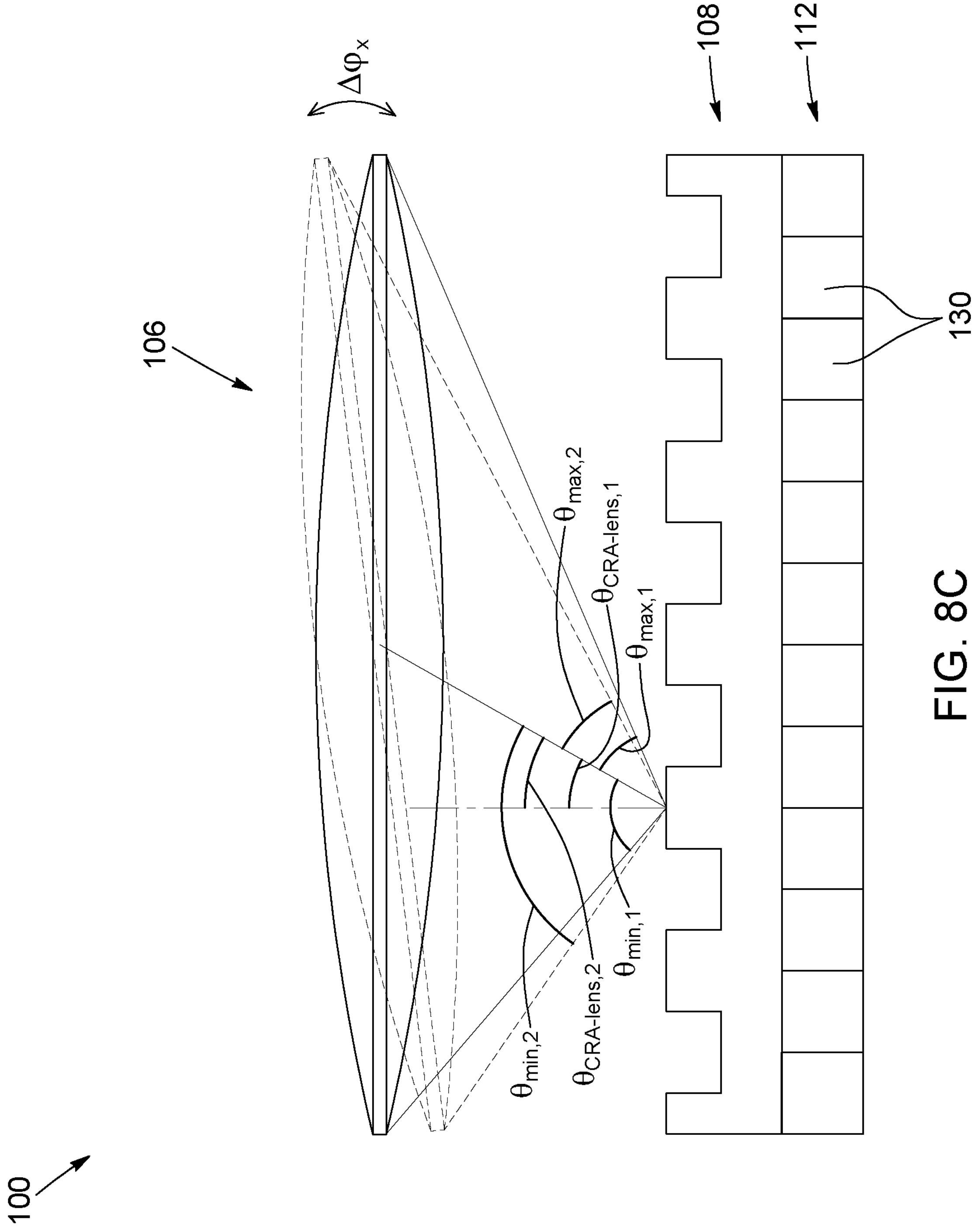

It is appreciated that the values of $\theta_{CRA-lens}$, $\theta_{min}$, and $\theta_{max}$ in Equation (6) depend not only on pixel position ($H_x$, $H_y$), but also on the position of the imaging lens 106 relative to the TDM 108 and the image sensor 112. Reference is made in this regard to FIGS. 8A to 8C, which illustrate the impact on $\theta_{CRA-lens}$, $\theta_{min}$, and $\theta_{max}$ of applying an axial shift Δz (FIG. 8A), a lateral shift Δx (FIG. 8B), and a tilt $\Delta\varphi_x$ (FIG. 8C) to the imaging lens 106. This means that a variation in the position of the imaging lens 106 generally leads to a change in the values of the parameters $\theta_{CRA-lens}$, $\theta_{min}$, and $\theta_{max}$ used in Equation (6), and, thus, to a change in the measured pixel responses $i_\pm(H_x, H_y)$. This also means that the measured pixel responses $i_\pm(H_x, H_y)$ may, in principle and under certain conditions, be used to retrieve or derive information about the position of the imaging lens 106.

Figure 9:
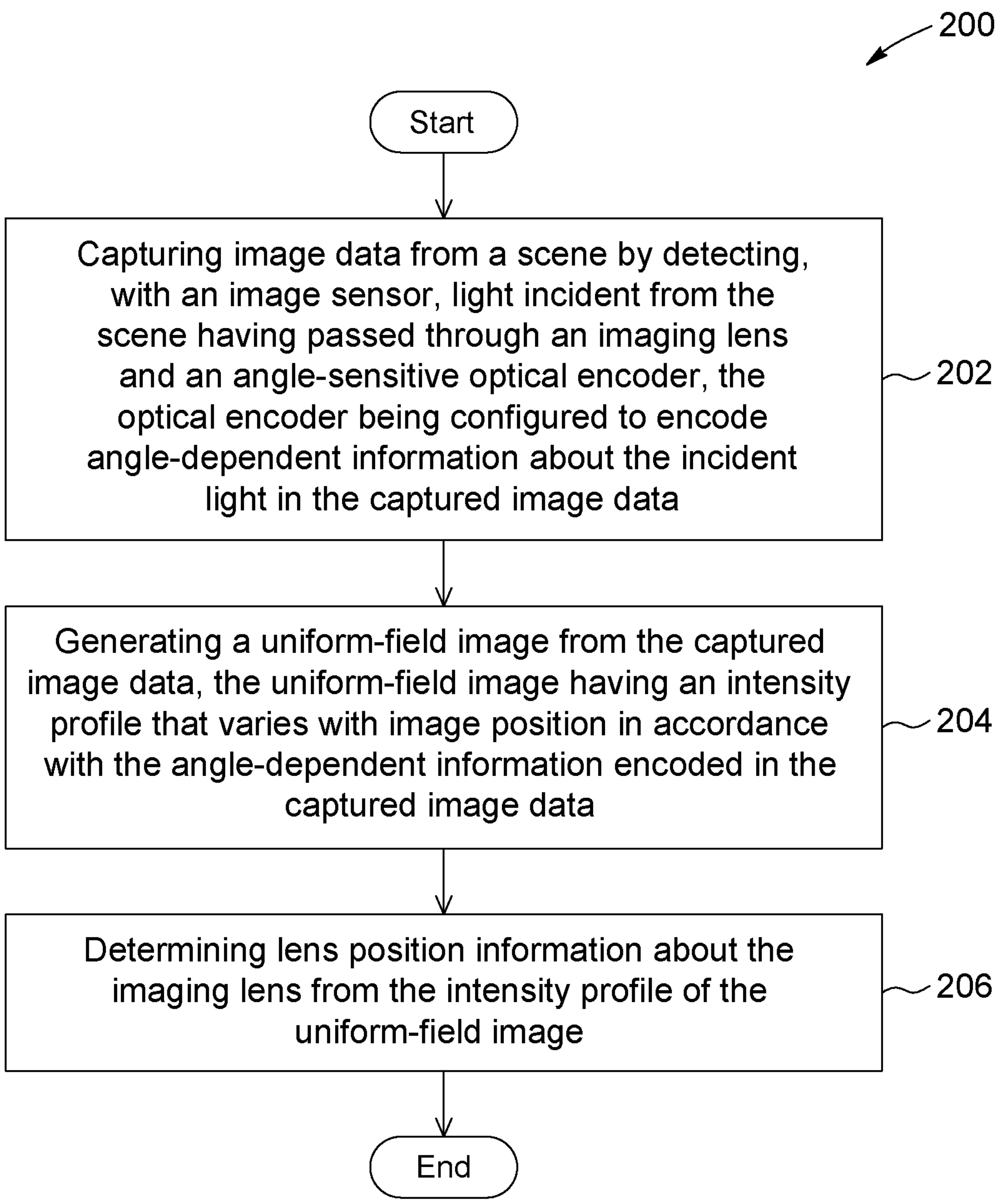
FIG. 9 is a flow diagram of a method of determining lens position information, in accordance with an embodiment.

Referring to FIG. 9, there is provided a flow diagram of a method 200 of lens position determination in an imaging system, such as the ones described herein, or another suitable imaging system. The imaging system generally includes an imaging lens whose position is to be determined, an image sensor including an array of pixels, and an angle-sensitive optical encoder, for example, a TDM, having an angular response and interposed between the imaging lens and the image sensor. The method 200 can include a step 202 of capturing image data from a scene by detecting, with the array of pixels of the image sensor, light incident from the scene having passed through the imaging lens and the optical encoder. The optical encoder is configured to encode angle-dependent information about the incident light in the image data in accordance with its angular response. The method can also include a step 204 of generating a uniform-field image from the captured image data, the uniform-field image having an intensity profile that varies with image position in accordance with the encoded angle-dependent information. For example, the angle-dependent information encoded in the image data by the encoder can include the CRA function of the imaging lens over the pixel array, the CRA shifting function of the optical encoder with respect to pixel array; and a range of angles of incidence within which the light incident from the scene reaches each pixel. The method can further include a step 206 of determining lens position information about the imaging lens from the intensity profile of the uniform-field image. In some embodiments, the lens position information thus determined can be used to provide a value for the lens-to-sensor distance $z_s$, which can be used to obtain the focus distance $z_f$, for example, using Equation (5). In turn, the focus distance $z_f$ can be used to derive absolute depth information (e.g., object distance $z_d$) from relative depth information (e.g., TDM disparity $d_{TDM}$), for example, using Equation (4). These and other possible steps the method 200 are described in greater detail below.

In the present description, the image to a uniform scene can be referred to as a "uniform-field image", a "uniform-scene image", or a "flat-field image". In some embodiments, the uniform-field image may be acquired by imaging a plain, non-textured background (e.g., a white or uniformly colored wall, screen, or surface) under uniform illumination, or by placing an optical diffuser in front of the imaging system during image capture. In such embodiments, the uniform-field image may be acquired in a laboratory or manufacturing setting or another controlled environment. In other embodiments, the uniform-field image may be obtained from one or several images acquired during normal operation of the imaging system by a user. In such embodiments, the uniform-field image may be acquired "on the fly" or automatically, without user intervention or knowledge. Depending on the application, the uniform-field image can be a full-frame image (i.e., obtained using all the pixels of the image sensor) or a partial-frame image (i.e., obtained using a reduced number of pixels of the image sensor).

It is appreciated that the image of a uniform scene is expected not to contain depth cues, such as edges and textures. This means that in the ideal case, the image of a uniform scene acquired by a TDM-based imaging system 100 should not contain any angle-dependent information about the scene 104 itself. Rather, any angle-dependent information encoded in the uniform-field image by the TDM 108 may be attributed to the characteristics of components of the imaging system 100 involved in the image capture process, including the imaging lens 106, the TDM 108, and the image sensor 112. From Equations (2), (3), and (6), a uniform-field image $i_{UF}(H_x, H_y)$ captured by a TDM-based imaging system 100 can be defined as follows:

$$i_{UF}(H_x, H_y) = \frac{i_+(H_x, H_y) - i_-(H_x, H_y)}{i_+(H_x, H_y) + i_-(H_x, H_y)} = \frac{i_{diff}(H_x, H_y)}{i_{sum}(H_x, H_y)} = \frac{\int_{-\theta_{min}}^{\theta_{max}} I_{diff}(\theta + \Delta_{CRA})d\theta}{\int_{-\theta_{min}}^{\theta_{max}} I_{sum}(\theta + \Delta_{CRA})d\theta}. \quad (7)$$

In Equation (7), the image data captured by the image sensor 112 for generating the uniform-field image $i_{UF}(H_x, H_y)$ includes a first set of pixel responses $i_+(H_x, H_y)$ corresponding to a first set of pixels 130$_O$ of the image sensor 112 and a second set of pixel responses $i_-(H_x, H_y)$ corresponding to a second set of pixels 130$_E$ of the image sensor 112, where $i_+(H_x, H_y)$ and $i_-(H_x, H_y)$ vary differently from each other as a function of angle of incidence due to the angle-dependent encoding provided by the TDM 108. In particular, as noted above, the pixel responses $i_+(H_x, H_y)$ of the first set have magnitudes that increase as the angle of incidence increases, and where the pixel responses of the second set $i_-(H_x, H_y)$ have magnitudes that decrease as the angle of incidence increases. In such embodiments, the step 204 of generating the uniform-field image $i_{UF}(H_x, H_y)$ includes substeps of computing a plurality of summed pixel responses $i_{sum}(H_x, H_y)$ based on a sum operation between the first set of pixel responses $i_+(H_x, H_y)$ and the second set of pixel responses $i_-(H_x, H_y)$; computing a plurality of differential pixel responses $i_{diff}(H_x, H_y)$ based on a difference operation between the first set of pixel responses $i_+(H_x, H_y)$ and the second set of pixel responses $i_-(H_x, H_y)$; and determining an intensity value of each image point $(H_x, H_y)$ of the uniform-field image $i_{UF}(H_x, H_y)$ as a ratio of a respective one of the plurality of differential pixel responses $i_{diff}(H_x, H_y)$ to a respective one of the plurality of summed pixel responses $i_{sum}(H_x, H_y)$, where the plurality of intensity values of the plurality of image points defines the intensity profile of the uniform-field image.

It is appreciated that defining $i_{UF}(H_x, H_y)$ in terms of the ratio between $i_{diff}(H_x, H_y)$ and $i_{sum}(H_x, H_y)$ can make $i_{UF}(H_x, H_y)$ independent, or substantially independent, of the intensity $I_0$ of the light 102 received from the uniform scene 104. It is also appreciated that when $I_{sum}$ and $I_{diff}$ are given by Equations (2) and (3), respectively, Equation (7) can be written as:

$$i_{UF}(H_x, H_y) = \left(\frac{m}{\theta_{max} + \theta_{min}}\right) \int_{-\theta_{min}}^{\theta_{max}} \sin[\beta(\theta + \Delta_{CRA})]d\theta, \quad (8)$$

which can be simplified as follows when $\beta(\theta_{max}+\Delta_{CRA})$ and $\beta(-\theta_{min}+\Delta_{CRA})$ are much smaller than 1:

$$i_{UF}(H_x, H_y) \approx \frac{\beta m}{2}(\theta_{max} - \theta_{min} + 2\Delta_{CRA}). \quad (9)$$

Figure 10:
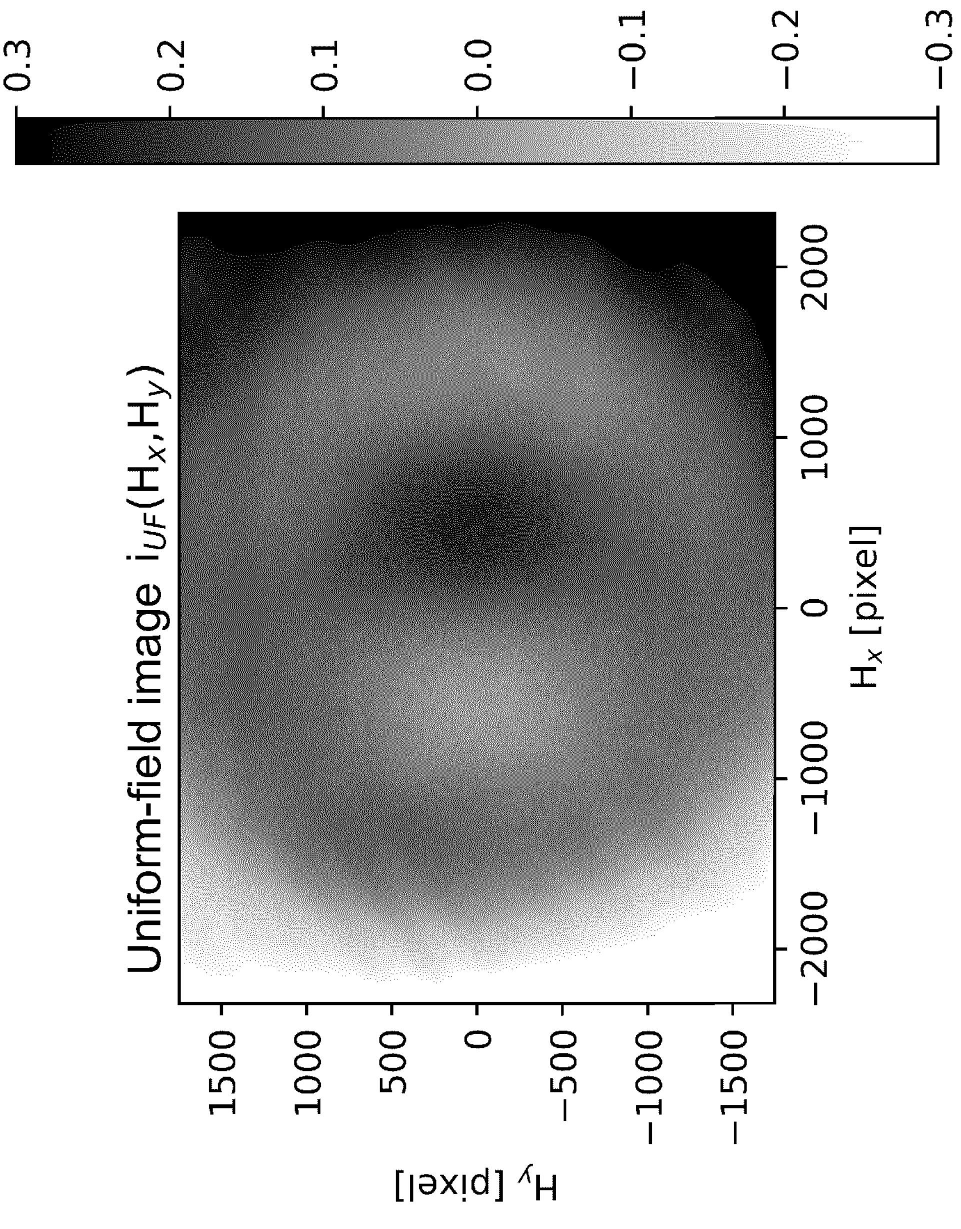
FIG. 10, which is a contour plot of a uniform-field image $i_{UF}(H_x, H_y)$ plotted as a function of image coordinates $H_x$ and $H_y$, in accordance with an embodiment.

It is appreciated that $i_{UF}(H_x, H_y)$ in Equation (8) is equal to zero at any pixel position where the interval $[-\theta_{min}, \theta_{max}]$ is symmetric about $\theta=-\Delta_{CRA}$, where, as noted above, $\theta$ is defined with respect to $\theta_{CRA\text{-}lens}$. This is generally the case at the center of the array, where $\Delta_{CRA}$ is expected to be zero (since both $\theta_{CRA\text{-}lens}$ and $\theta_{CRA\text{-}shift}$ are expected to be zero) and $\theta_{min}$ and $\theta_{max}$ are expected to be equal. However, $i_{UF}(H_x, H_y)$ is generally not equal to zero at an arbitrary value of $(H_x, H_y)$. This is illustrated in FIG. 10, which is a contour plot of measurements of $i_{UF}(H_x, H_y)$ plotted as a function of image coordinates $H_x$ and $H_y$. It is appreciated that deviations of $i_{UF}(H_x, H_y)$ from zero in FIG. 10 may be indicative of the interval $[-\theta_{min}, \theta_{max}]$ being asymmetric with respect to $\theta+\Delta_{CRA}=0$. This may arise, for example, when $\Delta_{CRA}\neq0$ and/or when $\theta_{min}\neq\theta_{max}$.

Figure 11:
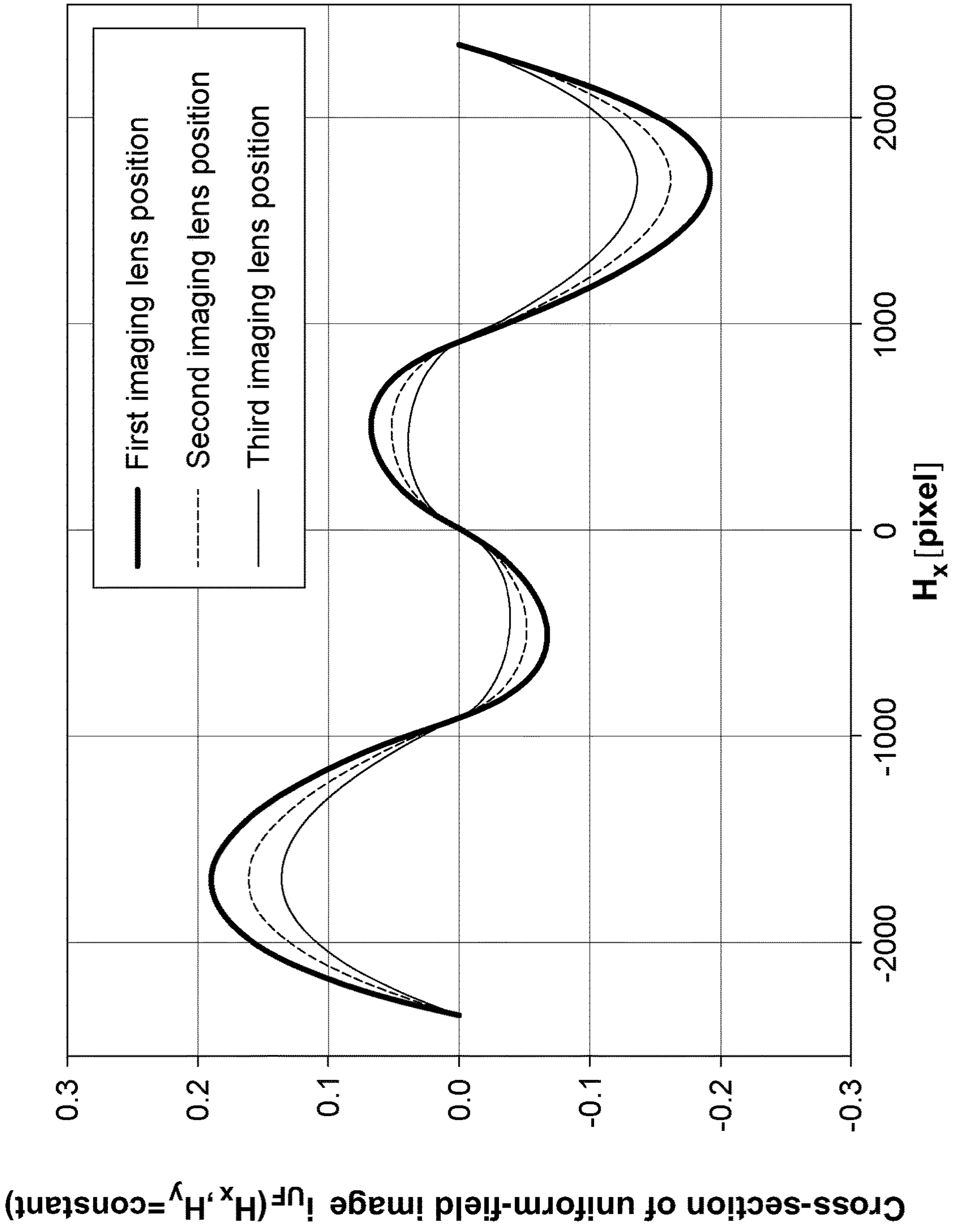
FIG. 11 is a graph depicting three cross-sectional curves of $i_{UF}(H_x, H_y)$ plotted as functions of $H_x$ at constant $H_y$.

It is also appreciated that the intensity profile of $i_{UF}(H_x, H_y)$ as a function of pixel position $(H_x, H_y)$ may convey information about the position of the imaging lens 106 with respect to the TDM 108 and the image sensor 112. This is illustrated in FIG. 11, which is a graph depicting three cross-sectional curves of $i_{UF}(H_x, H_y)$ plotted as functions of $H_x$ at constant $H_y$. The curves in FIG. 11 may be obtained from cross-sections of contour plots such as the one depicted in FIG. 10. The three curves in FIG. 11 are associated with three different axial positions of the imaging lens 106 along the optical axis 128, and thus three different pairs of values of $z_s$ and $z_f$ in Equation (5). FIG. 11 illustrates that different imaging lens positions can lead to different intensity profiles of $i_{UF}(H_x, H_y)$.

In some embodiments, information about the position $p_{lens}$ as of the imaging lens 106 may be retrieved from measurements of $i_{UF}(H_x, H_y)$ using an absolute determination method, that is, without reference to prior lens position information. In such an approach, lens position information may be determined from measurements of $i_{UF}(H_x, H_y)$ using a model relating $i_{UF}(H_x, H_y)$ to the position $p_{lens}$ of the imaging lens 106. Depending on the application, such a model may be obtained from experimental data, analytical calculations, numerical calculations, or any combination thereof. In some embodiments, the position of the imaging lens 106 may be represented as five-parameter function $p_{lens}(z, x, y, \varphi_x, \varphi_y)$, where z is an axial position along the optical axis 128 of the imaging lens 106, x is a first lateral position along a first lateral direction (x-axis) perpendicular to the optical axis 128, y is a second lateral position along a second lateral direction (y-axis) perpendicular to both the optical axis 128 and the x-axis, $\varphi_x$ is a first tilt angle relative to the x-axis, and $\varphi_y$ is a second tilt angle of the imaging lens relative toy-axis. In some embodiments, the axial position of the imaging lens 106 may be defined with respect to the image sensor 112, in which case $z=z_s$, the lens-to-sensor distance introduced above. The model relating $i_{UF}(H_x, H_y)$ to $p_{lens}(z, x, y, \varphi_x, \varphi_y)$ may include a model of how $\theta_{CRA\text{-}lens}$, $\theta_{min}$, and $\theta_{max}$ vary as a function of $p_{lens}(z, x, y, \varphi_x, \varphi_y)$. It is noted that if the imaging lens 106 is not rotationally symmetric about the optical axis 128, the position of the imaging lens 106 may be represented as a six-parameter function $p_{lens}(z, x, y, \varphi_x, \varphi_y, \varphi_z)$, where $\varphi_z$ is a rotation angle of the imaging lens 106 about the optical axis 128.

In other embodiments, information about the position $p_{lens}$ of the imaging lens 106 may be retrieved from measurements of $i_{UF}(H_x, H_y)$ using a relative determination method, that is, with reference to prior lens position information. For example, in some embodiments, determining the current lens position information $p_{lens,1}(Z_{s,1}, x_1, y_1, \varphi_{x,1}, \varphi_{y,1})$ about the imaging lens 106 from measurements of $i_{UF,1}(H_x, H_y)$ can include a step of providing reference data relating an intensity profile of a reference uniform-field image $i_{UF,0}(H_x, H_y)$ to reference lens position information $p_{lens,0}(z_{s,0}, z_0, y_0, \varphi_{x,0}, \varphi_{y,0})$, and a step of determining the current lens position information $p_{lens,1}$ from the intensity profile of the generated uniform-field image $i_{UF,1}(H_x, H_y)$ based on the reference data. The reference data relating $i_{UF,0}(H_x, H_y)$ to $p_{lens,0}$ may be obtained at an earlier time (e.g., at the time of manufacture or later) by performing measurements of $i_{UF,0}(H_x, H_y)$ under conditions where the lens position $p_{lens,0}$ is known or assumed to be known. In such embodiments, the current lens position $p_{lens,1}$ may be determined by performing the following operations: obtaining measurements of $i_{UF,1}(H_x, H_y)$ at the current lens position $p_{lens,1}$; determining, from the measurements of $i_{UF,1}(H_x, H_y)$ at the current lens position $p_{lens,1}$ and the reference data relating $i_{UF,0}(H_x, H_y)$ to $p_{lens,0}$ an intensity profile difference $\delta i_{UF}(H_x, H_y, \delta p_{lens})=i_{UF,1}(H_x, H_y)-i_{UF,0}(H_x, H_y)$ between the intensity profile of $i_{UF,1}(H_x, H_y)$ and the intensity profile of $i_{UF,0}(H_x, H_y)$; determining lens position variation information $\delta p_{lens,1}=p_{lens,1}-p_{lens,0}$ from the intensity profile difference $\delta i_{UF}(H_x, H_y, \delta p_{lens})$; and determining the current lens position information $p_{lens,1}$ from the reference lens position information $p_{lens,0}$ and the lens position variation information $\delta p_{lens}$, using $p_{lens,1}=p_{lens,0}+\delta p_{lens}$. In some embodiments, $p_{lens,0}$ may be unknown or not known precisely enough. In such embodiments, the lens position variation information $\delta_{lens}$ determined from the intensity profile difference $\delta i_{UF}(H_x, H_y, \delta p_{lens})$ may be used to provide relevant current lens position information, for example, for adjusting calibration.

In some embodiments, the function $\delta i_{UF}(H_x, H_y, \delta p_{lens})$ representing the difference between $i_{UF,1}(H_x, H_y)$ at the current lens position $p_{lens,1}$ and $i_{UF,0}(H_x, H_y)$ at the reference lens position $p_{lens,0}$ can be reasonably assumed to be proportional to the difference between the lens CRA function $\theta_{CRA\text{-}lens,1}(H_x, H_y)$ at $p_{lens,1}$ and the lens CRA function $\theta_{CRA\text{-}lens,0}(H_x, H_y)$ at $p_{lens,0}$. In such a case, the determination of the lens position variation information $\delta p_{lens}$ from the intensity profile difference $\delta i_{UF}(H_x, H_y, \delta p_{lens})$ can include a step of relating the intensity profile difference $\delta_{UF}(H_x, H_y, \delta P_{lens})$ to a variation $\delta\theta_{CRA\text{-}lens}(H_x, H_y, \delta p_{lens})$ in the CRA function of the imaging lens 106, as follows:

$$\begin{aligned}\delta i_{UF}(H_x, H_y, \delta p_{lens}) &= i_{UF,1}(H_x, H_y, p_{lens,1}) - i_{UF,0}(H_x, H_y, p_{lens,0}) \\ &= A[\theta_{CRA-lens,1}(H_x, H_y, p_{lens,1}) - \\ &\quad \theta_{CRA-lens,0}(H_x, H_y, p_{lens,0})] \\ &= A\delta\theta_{CRA-lens}(H_x, H_y, \delta p_{lens}),\end{aligned} \tag{10}$$

where A is a scaling or proportionality factor, which can depend, inter alfa, on the f-number of the imaging lens 106 and parameters of the TDM 108. Equation (10) assumes that (i) $I_\pm(\theta)$ and $\theta_{CRA\text{-}shift}(H_x, H_y)$ do not change over time, which assumes that the position of the TDM 108 relative to the image sensor 112 remains the same during operation of the imaging system 100, and that (ii) the impact of $\delta p_{lens}$ on $\theta_{min}(H_x, H_y)$ and $\theta_{max}(H_x, H_y)$ can be neglected compared to the impact of $\delta p_{lens}$ on $\Delta_{CRA}(H_x, H_y)$, which has been found to be typically the case in practice. The scaling factor A relating $\delta i_{UF}(H_x, H_y, \delta p_{lens})$ to $\delta\theta_{CRA\text{-}lens}(H_x, H_y, 6\delta p_{lens})$ may be obtained by calibration, for example, by acquiring a set of uniform-field images $i_{UF}(H_x, H_y)$ at a corresponding set of known lens positions $p_{lens}$, or using a model. It is noted that when Equation (3) applies, the scaling factor A can be approximated as $\beta m$.

From Equation (10), the determination of the lens position variation information $\delta p_{lens}$ from the intensity profile difference $\delta i_{UF}(H_x, H_y, \delta p_{lens})$ can include a step of determining the lens position variation information $\delta p_{lens}$ from the variation $\delta\theta_{CRA\text{-}lens}(H_x, H_y, \delta p_{lens})$ in the CRA function of the imaging lens 106 using a model relating lens CRA function variations to changes in lens position. In some embodiments, the model can be established based on a nominal CRA function $\theta_{CRA\text{-}lens}{}^*(H_x, H_y)$ of the imaging lens 106 defined at a nominal position (e.g., at $z_s$=f and $x=y=\varphi_x=\varphi_y=0$) of the imaging lens 106. For example, in some embodiments, $\theta_{CRA\text{-}lens,1}(H_x, H_y, p_{lens,1})$ and $\theta_{CRA\text{-}lens,0}(H_x, H_y, p_{lens,0})$ may be expressed in terms of a nominal CRA function $\theta_{CRA\text{-}lens*}(H_x, H_y)$ of the imaging lens 106 as follows:

$$\theta_{CRA\text{-}lens,1}(H_x, H_y, p_{lens,1})=\theta_{CRA\text{-}lens*}(f\tan(\gamma_{x,1}-\varphi_{x,1})-x_1, f\tan(\gamma_{y,1}-\varphi_{y,1})-y_1)+\varphi_{x,1}, \tag{11}$$

$$\theta_{CRA\text{-}lens,0}(H_x, H_y, p_{lens,0})=\theta_{CRA\text{-}lens*}(f\tan(\gamma_{x,0}-\varphi_{x,0})-x_0, f\tan(\gamma_{y,0}-\varphi_{y,0})-y_0)+\varphi_{x,0}, \tag{12}$$

where $\gamma_{x,1}=\arctan(H_x/z_{a,1})$, $\gamma_{y,1}=\arctan(H_y/z_{s,1})$, $\gamma_{x,0}=\arctan(H_x/z_{s,0})$, and $\gamma_{y,0}=\arctan(H_y/z_{s,0})$, the x-axis is parallel to the grating axis 118 of the TDM 108, and the nominal CRA function $\theta_{CRA\text{-}lens}{}^*(H_x, H_y)$ is defined at $z_s$=f and $x=y=\varphi_x=\varphi_y=0$. The relationship for $\gamma_{x,1}$, $\gamma_{y,1}$, $\gamma_{x,0}$, and $\gamma_{y,0}$ can be found from FIGS. 8A and 8B. The nominal CRA function $\theta_{CRA\text{-}lens}{}^*(H_x, H_y)$ of the imaging lens 106 can be found in the datasheet provided by the manufacturer or be otherwise known. Then, using Equations (11) and (12) in Equation (10), the following approximate expression for $\delta\theta_{CRA\text{-}lens}(H_x, H_y, \delta p_{lens})$ may be obtained:

$$\begin{aligned}\delta\theta_{CRA-lens}(H_x, H_y, \delta p_{lens}) &\approx \frac{\partial\theta_{CRA-lens^*}}{\partial z_s}\delta z_s + \frac{\partial\theta_{CRA-lens^*}}{\partial x}\delta x + \\ &\frac{\partial\theta_{CRA-lens^*}}{\partial y}\delta y + \frac{\partial\theta_{CRA-lens^*}}{\partial\varphi_x}\delta\varphi_x + \frac{\partial\theta_{CRA-lens^*}}{\partial\varphi_x}\delta\varphi_y \approx - \\ &\frac{\partial\theta_{CRA-lens^*}}{\partial H_x}\left[\frac{fH_x}{z_{s,0}^2}\delta z_s + \delta x + f\sec^2(\gamma_{x,0} - \varphi_{x,0})\delta\varphi_x\right] - \\ &\frac{\partial\theta_{CRA-lens^*}}{\partial H_y}\left[\frac{fH_y}{z_{s,0}^2}\delta z_s + \delta y + f\sec^2(\gamma_{y,0} - \varphi_{y,0})\delta\varphi_y\right] + \delta\varphi_x.\end{aligned} \tag{13}$$

Equation (13) provides a convenient analytical expression that relates variations in lens CRA, $\delta\theta_{CRA\text{-}lens}(H_x, H_y)$, to variations in lens position, $\delta p_{lens}(\delta z_s, \delta x, \delta y, \delta\varphi_x, \delta\varphi_y)$, and that depends weakly on absolute lens position information (i.e., the terms $z_{s,0}$, $\gamma_{x,0}$, $\varphi_{x,0}$, $\gamma_{y,0}$, $\varphi_{y,0}$). Results calculated from the model provided by Equation (13) have been found to agree well with experiment over a range of lens positions.

In some embodiments, uniform field data $\delta i_{UF}(H_x, H_y)$ may be obtained from measurements. The measured uniform field data $\delta i_{UF}(H_x, H_y)$ may be related to lens CRA variation information $\delta\theta_{CRA\text{-}lens}(H_x, H_y)$ using Equation (10). In turn, the $\delta\theta_{CRA\text{-}lens}(H_x, H_y)$ information may be processed using Equation (13) to provide relative lens position information $\delta p_{lens}(\delta z_s, \delta x, \delta y, \delta\varphi_x, \delta\varphi_y)$, from which the current lens position $p_{lens,1}=p_{lens,0}+\delta p_{lens}$ may be obtained. The current lens position $p_{lens,1}$ may be used to provide a current value $z_{s,1}$ for the lens-to-sensor distance $z_s$, which may be used in Equation (5) to obtain a current value $z_{f,1}$ for the focus distance $z_f$. In turn, the current focus distance value $z_{f,1}$ may be used in Equation (4) to derive absolute depth information (e.g., object distance $z_d$) from relative depth information [e.g., TDM disparity $d_{TDM}$ obtained from $I_{sum}$ and $I_{diff}$ given by Equations (2) and (3)]. It is appreciated that in such embodiments, the current lens position $p_{lens,1}$ and/or the change in lens position $\delta p_{lens}$ can be used to correct, adjust, or otherwise update the calibration curve relating $d_{TDM}$ (relative depth information) to $z_d$ (absolute depth information), for example, by replacing the focus distance value $z_{f,0}$ stored in memory with the current focus distance value $z_{f,1}$ or by adjusting the calibration curve to compensate for a lens tilt $\delta\varphi_x$ or $\delta\varphi_y$.

Depending on the application, the imaging lens 106 may be a fixed-focus lens or a variable-focus lens. In fixed-focus applications, the lens position determination method disclosed herein may be used to correct or compensate for inadvertent variations over time in the position of the imaging lens 106 with respect to the image sensor 112 (e.g., due to thermal expansion, mechanical shocks, positional drifts in lens or sensor components, and the like). In variable-focus lens applications, for example, applications with autofocus capabilities, the lens position determination method may be used at suitable intervals, for example, every time focus is changed, to reassess the position of the imaging lens 106.

In some embodiments, the focus distance $z_f$ can be changed to provide more accurate or robust absolute depth estimation. For example, relative depth information is often more accurate when $z_d$ is close to $z_f$, so that bringing the focus to the object to be measured can increase the accuracy of the depth measurement. In such embodiments, the lens position determination method disclosed herein can be used to provide a current value of $z_s$, from which a current value of $z_f$ can be obtained and used to adjust the calibration curve relating $d_{TDM}$ to $z_d$.

In some embodiments, the present techniques may be used in a laboratory or manufacturing environment, for example, to obtain initial calibration information relating TDM disparity $d_{TDM}$ to object distance $z_d$ at various focus distances $z_f$, or to provide feedback or monitoring on lens alignment during production. In such embodiments, the scene 104 that is imaged to provide the image data used to generate a uniform-field image for lens position determination can be a plain, non-textured background representative of a uniform field. In this case, the captured image data can include at least one image of the scene (e.g., a single or a few images), and the uniform-field image can be generated from the at least one image without performing a prior step of removing depth cues from the at least one image. In some embodiments, the present techniques may be used in stereoscopic and multiscopic imaging systems to verify and ensure that the lens positions of the two or more cameras are the same or within some predetermined tolerance of one another.

In some embodiments, the present techniques may be used during normal operation of an imaging system by a user. In such embodiments, obtaining an image of a blank, texture-less scene may not be practical or even possible. In some embodiments, in order to address this issue, uniform-field image data $i_{UF}(H_x, H_y)$ may be acquired not by directly capturing an image of a uniform background scene, but by capturing one or several "normal" images, where each normal image need not be an image of a uniform scene, and by processing the one or more normal images to obtain uniform-field image data $i_{UF}(H_x, H_y)$ that is representative of a uniform scene. In some embodiments, the processing of the one or more normal images can include steps of removing depth cues from the one or more normal images, combining the one or more normal images of the scene with removed depth cues into a fused image, and generating the uniform-field image $i_{UF}(H_x, H_y)$ from the fused image of the scene. As noted above, in such embodiments, the uniform-field image data $i_{UF}(H_x, H_y)$ may be acquired on the fly or automatically, without user intervention or knowledge.

In some embodiments, the acquisition of uniform-field image data $i_{UF}(H_x, H_y)$ may include a step of capturing a stream of images during normal use of the imaging system by a user, and a step of combining and processing the normal images together to remove therefrom edges and other depth information, thereby obtaining the uniform-field image data $i_{UF}(H_x, H_y)$. The processing may involve applying a gradient operator for edge detection (or another suitable operator or combination of operators) on the normal images and removing therefrom detected edges in accordance with a specified threshold condition. For example, in some embodiments, the number of normal images may range from about 3 to about 300, for example from about 3 to about 50, although less or more normal images may be used in other embodiments. In some embodiments, it may not be efficient to keep a buffer of ten or more normal images in memory. In such embodiments, a moving or rolling average approach may be implemented in which the averaged or fused uniform-field image data $i_{UF}(H_x, H_y)$ is obtained progressively, one or a few normal images at a time, so that only one or a few normal images are kept in memory at any given time. This approach can improve buffer management efficiency, which can be advantageous in applications where memory size and/or access bandwidth are limited. Once the uniform-field image data $i_{UF}(H_x, H_y)$ has been reconstructed on the fly, it can be used such as described above, for example, for determining lens position and focus distance information, adjusting calibration data relating relative and absolute depth information, and/or determining absolute depth information from relative depth information obtained from TDM disparity measurements.

Figure 12:
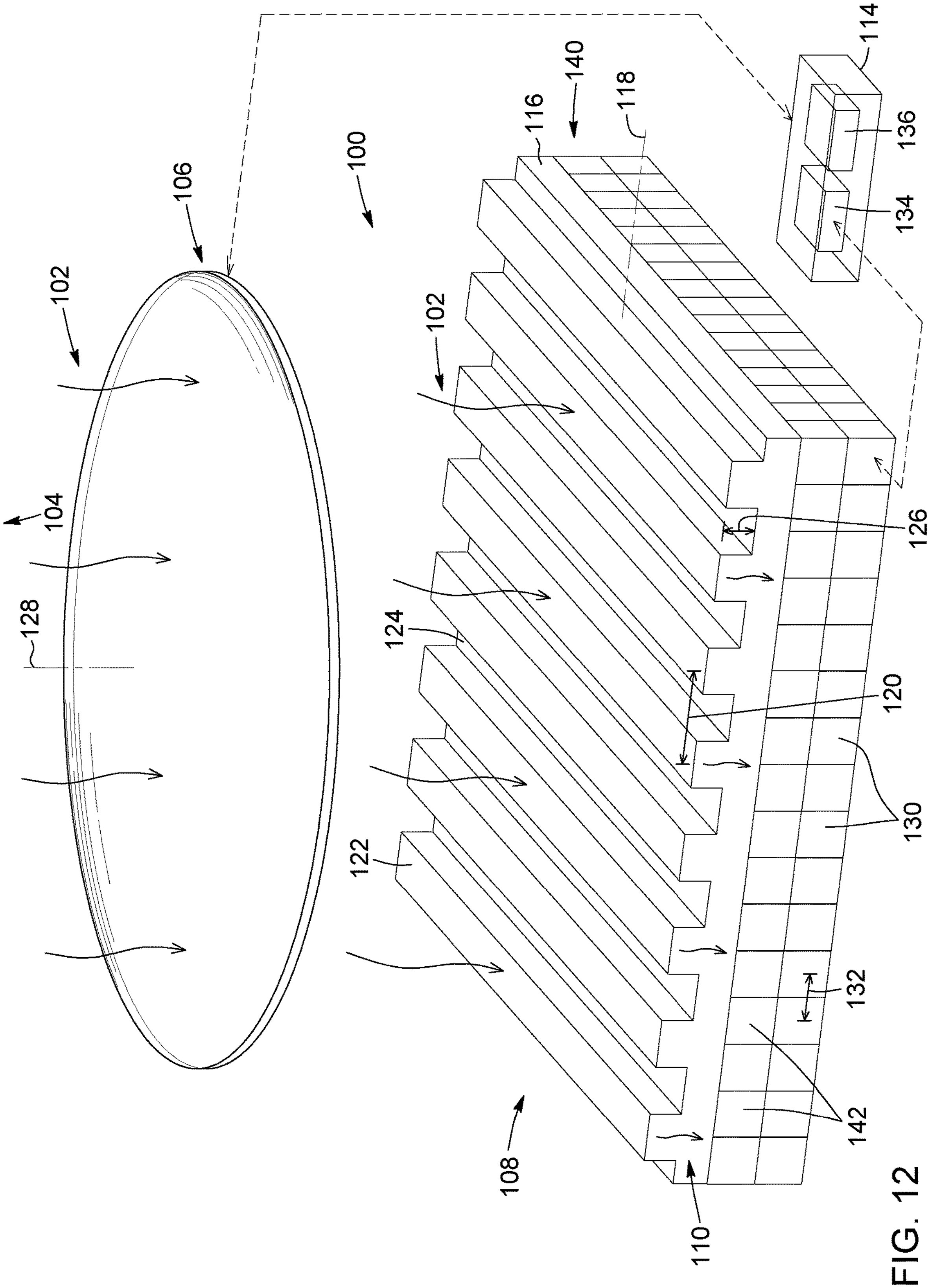
FIG. 12 is a schematic perspective view of a depth imaging system, in accordance with another embodiment.

Referring to FIG. 12, there is illustrated another embodiment of a depth imaging system 100 with which the lens position determination techniques described herein may be used. The embodiment of FIG. 12 shares several features with the embodiment of FIGS. 1 and 2, which will not be described again other than to highlight differences between them. In contrast to the embodiment of FIGS. 1 and 2, which is intended for monochrome applications, the embodiment of FIG. 12 is intended for color applications. In FIG. 12, the image sensor 112 includes a color filter array 140 interposed between the TDM 108 and the array of pixels 130. The color filter array 140 includes a plurality of color filters 142 arranged in a mosaic color pattern. The color filter array 140 is configured to filter the diffracted light 110 produced by the TDM 108 spatially and spectrally according to the mosaic color pattern prior to detection of the diffracted light 110 by the array of pixels 130. In some embodiments, the color filters 142 may include red, green, and blue filters, although other filters may alternatively or additionally be used in other embodiments, such as yellow filters, cyan filters, magenta filters, clear or white filters, and infrared filters. In some embodiments, the mosaic color pattern of the color filter array 140 may be an RGGB Bayer pattern, although other mosaic color patterns may be used in other embodiments, including both Bayer-type and non-Bayer-type patterns. Non-limiting examples include, to name a few, RGB-IR, RGB-W, CYGM, and CYYM patterns. In color implementations, the determination of uniform-field image data from the pixel responses measured by the pixels 130 can be performed on a per-color basis by parsing the pixel data according to color components, for example, based on techniques such as or similar to those described in co-assigned international patent applications PCT/CA2017/050686 (published as WO 2017/210781), PCT/CA2018/051554 (published as WO 2019/109182), and PCT/CA2020/050760 (published as WO 2020/243828). In some embodiments, chromatic aberrations and color crosstalk can be corrected prior to obtaining the uniform-field image data.

Figure 13:
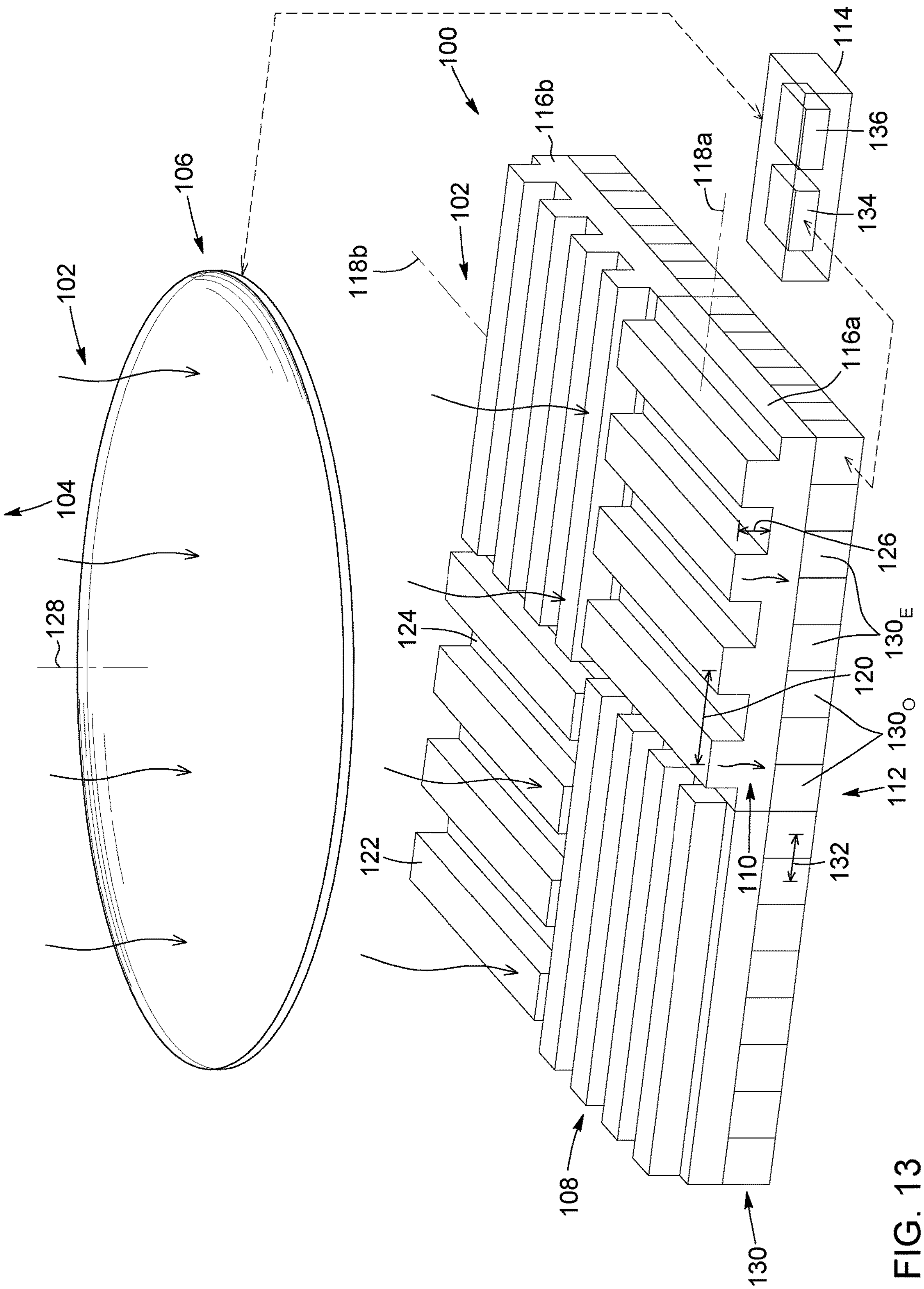
FIG. 13 is a schematic perspective view of a depth imaging system, in accordance with another embodiment.

For simplicity, several embodiments described above include TDMs provided with a single diffraction grating and, thus, a single grating orientation. However, it is appreciated that, in practice, TDMs will generally include a large number of diffraction gratings and may include multiple grating orientations. Referring FIG. 13, in some embodiments, the TDM 108 may include a first set of diffraction gratings 116*a* and a second set of diffraction grating 116*b*, where the grating axes 118*a* of the diffraction gratings 116*a* of the first set are perpendicular to the grating axes 118*b* of the diffraction gratings 116*b* of the second set. In such embodiments, the generation of the uniform-field image can include a step of generating a first portion of the uniform-field image from a first portion of the captured image data having angle-dependent information encoded therein by the first set of diffraction gratings 116*a*, and a step of generating a second portion of the uniform-field image from a second portion of the captured image data having angle-dependent information encoded therein by the second set of diffraction gratings 116*b*. Furthermore, the step of determining the current lens position information can include a step of determining first lens position information from a first intensity profile of the first portion of the uniform-field image, determining second lens position information from a second intensity profile of the second portion of the uniform-field image, and determining the current lens position information from the first lens position information and the second lens position information. It is appreciated that determining the current lens position information from two sources of uniform-field image data associated with orthogonal grating axis orientations can be advantageous in some applications, for example, to determine more precisely lateral displacements ($\delta x$, $\delta y$) or tilt displacements ($\delta\varphi_x$, $\delta\varphi_y$) of the imaging lens.

In some embodiments, the first set of diffraction gratings 116*a* and the second set of diffraction gratings 116*b* may be interleaved in rows and columns to define a checkerboard pattern. It is appreciated, however, that any other suitable regular or irregular arrangements of orthogonally or non-orthogonally oriented sets of diffraction gratings may be used in other embodiments. For example, in some variants, the orthogonally oriented sets of diffraction gratings may be arranged to alternate only in rows or only in columns, or be arranged randomly. Other variants may include more than two sets of diffraction gratings. Providing TDMs with multiple grating orientations can improve lens position determination by providing multiple sources of lens position information.

In addition, although several embodiments described above include TDMs provided with one-dimensional, binary phase gratings formed of alternating sets of parallel ridges and grooves defining a square-wave grating profile, other embodiments may use TDMs with other types of diffraction gratings. For example, other embodiments may use diffraction gratings where any, some, or all of the grating period, the duty cycle, and the step height are variable; diffraction gratings with non-straight features perpendicular to the grating axis; diffraction gratings having more elaborate grating profiles; 2D diffraction gratings; photonic crystal diffraction gratings; and the like. The properties of the diffracted light may be tailored by proper selection of the grating parameters. Furthermore, in embodiments where TDMs include multiple sets of diffraction gratings, the diffraction gratings in different sets need not be identical. In general, a TDM may be provided as a grating tile made up of many grating types, each grating type being characterized by a particular set of grating parameters. Non-limiting examples of such grating parameters include the grating orientation, the grating period, the duty cycle, the step height, the number of grating periods, the lateral offset with respect to the underlying pixels and/or color filters, the grating-to-sensor distance, and the like.

It is appreciated that the lens position determination techniques described herein can be used in focus adjustment processes, for example, to adjust the focal distance of an imaging system to a specified value. In some applications, the present techniques can be used to complement, enhance, or replace conventional focus adjustment methods, such as phase detection autofocus methods or other autofocus methods based on the contrast or texture detection. Such conventional methods can involve measuring a disparity or another metric of an object in a scene, and using the measured disparity or metric as a feedback mechanism to adjust the lens position and bring the object in focus. Such a process can take a few frames to converge to the desired focus distance. Furthermore, if the scene is very blurry or has low contrast, conventional autofocus methods tend to be slower and less accurate, or may even become inoperable.

Figure 14:
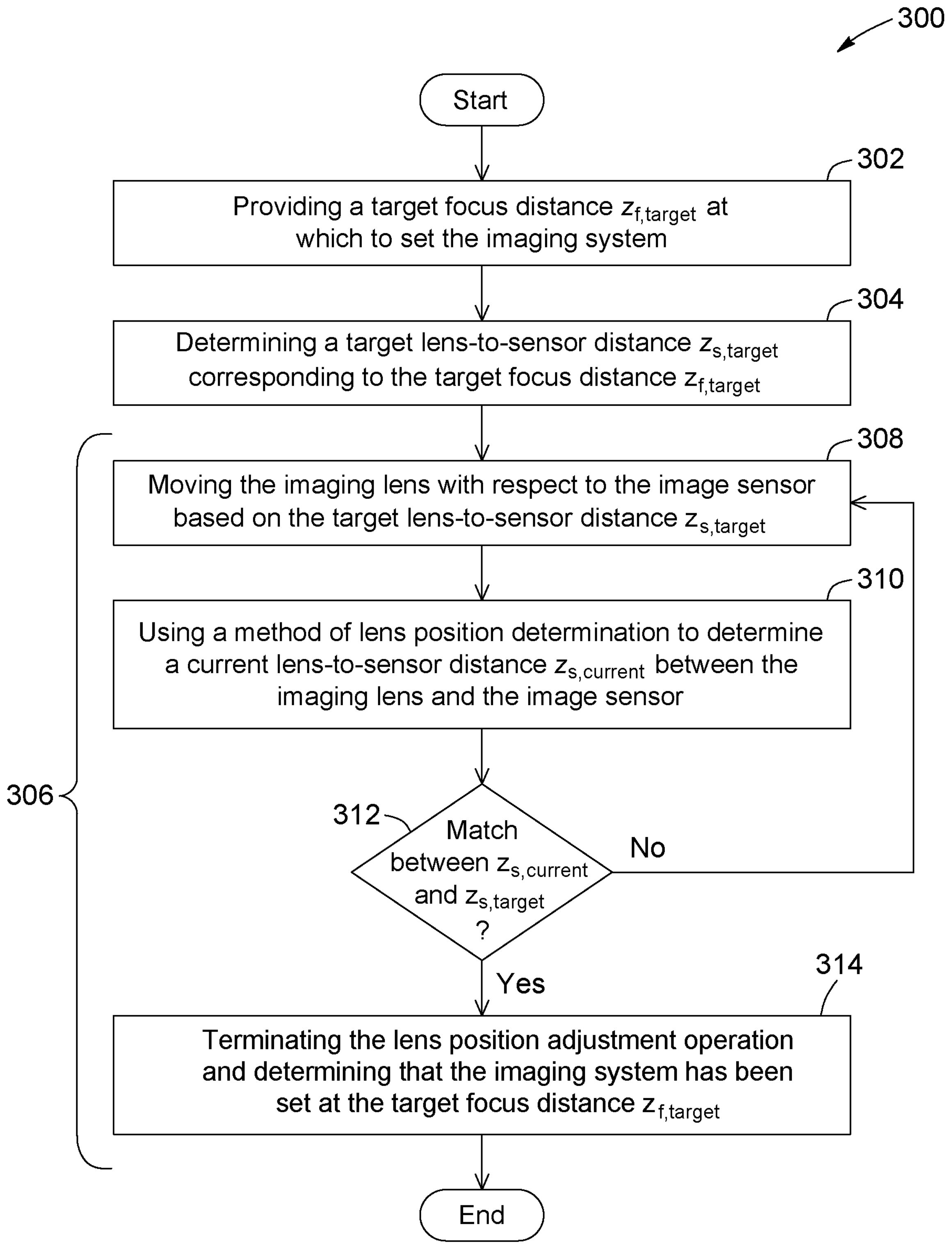
FIG. 14 is a flow diagram of a method of focus distance adjustment in an imaging system, in accordance with an embodiment.

Referring to FIG. 14, in accordance with another aspect, there is provided a flow diagram of a method 300 of focus distance adjustment in an imaging system including an imaging lens, an image sensor including an array of pixels, and an angle-sensitive optical encoder interposed between the imaging lens and the image sensor. The method 300 of FIG. 14 may be implemented in an imaging system such as the ones described herein, or another suitable imaging system.

The focus adjustment method 300 of FIG. 14 includes a step 302 of providing a target focus distance $z_{f,target}$ at which it is desired or required to set the imaging system. Depending on the application, the target focus distance may be selected by a user or may be determined by the imaging system without user intervention or knowledge.

The focus adjustment method 300 also includes a step 304 of determining a target lens-to-sensor distance $z_{s,target}$ between the imaging lens and the image sensor, the target lens-to-sensor distance $z_{s,target}$ corresponding to the target focus distance $z_{f,target}$. In some embodiments, the step 304 of determining the target lens-to-sensor distance $z_{s,target}$ corresponding to the target focus distance $z_{f,target}$ can include computing the target lens-to-sensor distance $z_{s,target}$ from the target focus distance $z_{f,target}$ and a focal length f of the imaging lens according to the thin-lens equation as follows: $z_{s,target}=[(1/f)-(1/z_{f,target})]^{-1}$ [see also Equation (5)].

The focus adjustment method 300 further includes performing a lens position adjustment operation 306 including one or more iterative cycles. In FIG. 14, each iterative cycle includes a step 308 of moving the imaging lens with respect to the image sensor based on the target lens-to-sensor distance $z_{s,target}$. The aim of this step is to move the imaging lens so that the actual lens-to-sensor distance corresponds to the target lens-to-sensor distance $z_{s,target}$. Depending on the application, various types of lens actuators can be used to move the imaging lens with respect to the image sensor based on the target lens-to-sensor distance $z_{s,target}$. In some embodiments, the imaging system can include a processor configured to send control signals to a lens actuator to adjust the position of the imaging lens to try to match the target lens-to-sensor distance. In some embodiments, the lens actuator can also tilt and/or displace laterally the imaging lens to align the image plane with the sensor plane. In some embodiments, the lens actuator can be replaced or complemented by a sensor actuator that moves the image sensor with respect to the imaging lens.

As noted above, precisely adjusting the position of a lens to a specific lens position can be challenging or impractical to achieve. In order to verify the accuracy of the lens moving step 308, the lens position adjustment operation 306 can include a step 310 of determining, using a method of determining lens position information such as described herein, current lens position information about the imaging lens. For example, returning to FIG. 9, a possible implementation of the method 200 of determining lens position information can include a step 202 of capturing image data from a scene by detecting, with the array of pixels of the image sensor, light incident from the scene having passed through the imaging lens and the angle-sensitive optical encoder, a step 204 of generating a uniform-field image from the captured image data, the uniform-field image having an intensity profile that varies with image position in accordance with the encoded angle-dependent information, and a step 206 of determining the current lens position information about the imaging lens from the intensity profile of the uniform-field image. The current lens position information determined by the lens position determination step 310 includes a current lens-to-sensor distance $z_{s,current}$ between the imaging lens and the image sensor.

Once the current lens-to-sensor distance $z_{s,current}$ has been determined, the method 300 of FIG. 14 includes a step 312 of determining whether there is a match between the current lens-to-sensor distance $z_{s,current}$ and the target lens-to-sensor distance $z_{s,target}$. It is appreciated that various criteria can be used to assess whether there is a match between the current lens-to-sensor distance $z_{s,current}$ and the target lens-to-sensor distance $z_{s,target}$. For example, in some embodiments, the current lens-to-sensor distance $z_{s,current}$ may be considered to match the target lens-to-sensor distance $z_{s,target}$ if a difference between the current lens-to-sensor distance $z_{s,current}$ and the target lens-to-sensor distance $z_{s,target}$ is smaller than a predetermined threshold, for example, with an absolute error of less than 1 μm. If the match determination step 312 determines that there is a match between the current lens-to-sensor distance $z_{s,current}$ and the target lens-to-sensor distance $z_{s,target}$, the method 300 includes a step 314 of terminating the lens position adjustment operation and determining that the imaging system has been set at the target focus distance $z_{f,target}$. However, if the match determination step 312 determines that there is not a match between the current lens-to-sensor distance $z_{s,current}$ and the target lens-to-sensor distance $z_{s,target}$, the method 300 includes performing another iterative cycle in the lens position adjustment operation 306, which involves repeating steps 308, 310, and 312 at least another time.

In some embodiments, the focus adjustment method disclosed herein can be used to kick-start a conventional autofocus system when the imaging lens is very far from its optimal position and the image is very blurry. Knowing the usual working range of the imaging system, the lens position determination techniques disclosed herein can be applied to bring the focus closer to the working range, at which point the conventional autofocus system can take over.

In some embodiments, a user may be required to input where he or she wants the focus to be. If it happens to be a texture-less region of the scene, conventional autofocus methods may not work, and using the lens position determination techniques disclosed herein in a focus adjustment method may be relevant.

In some applications, it may be desired or required that autofocus be faster or nearly instantaneous, which can be an issue with conventional autofocus methods that require a few frames for the autofocus operation to converge. In some embodiments, the present techniques can be used to directly set the focus distance to correspond to a predicted position of an object in an upcoming frame. Such embodiments can forego waiting for a picture of the object to adjust the autofocus feedback loop, and instead can use a lens positioning feedback loop such as described above (see lens position adjustment operation 306 of the focus adjustment method 300 depicted in FIG. 14) to provide feedback based on texture-less regions in the scene, which can be on the object or not. An example of a situation in which setting the focus distance of an imaging system to a predicted position of an object in an upcoming frame is when an object is moving in the scene in a predictable manner, such that its position of the object in the upcoming frame may be predicted based on its speed and distance. Detecting or estimating the distance of an object can be done in various ways. In some embodiments where there is prior knowledge about the dimensions of the object, object distance can be determined based on the magnification of the object in an image of the object (apparent size in pixels). In other embodiments, various depth determination techniques, including TDM-based depth determination techniques, can be used to predict object distance.

Figure 15:
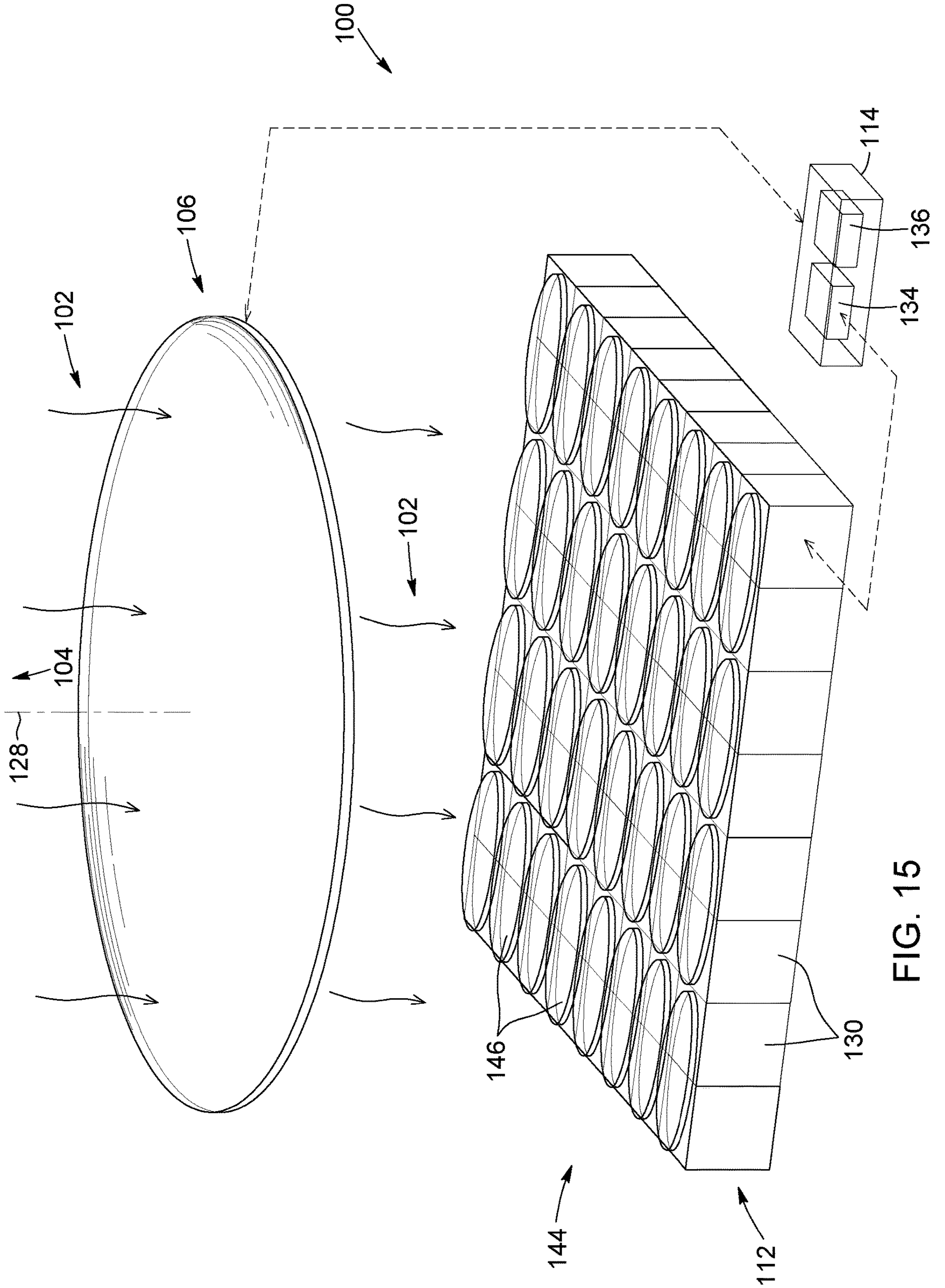
FIG. 15 is a schematic perspective view of a depth imaging system, in accordance with another embodiment.

Although several embodiments described above use TDMs as optical encoders of angle-of-incidence information, other embodiments may use other types of optical encoders with angle encoding capabilities. Referring to FIG. 15, there is illustrated another embodiment of an imaging system 100 in which the lens position determination and focus adjustment techniques disclosed herein may be implemented. The imaging system 100 is configured for capturing image data representative of light 102 received from a scene 104. The imaging system 100 generally includes an imaging lens 106, an angle-sensitive optical encoder embodied by a microlens array 144 having a plurality of microlenses 146, an image sensor 112 having a plurality of pixels 130, and a computer device 114 including a processor 134 and a memory 136. In the illustrated embodiment, each microlens 146 of the microlens array 144 covers two pixels 130 of the image sensor 112. The microlens array 144 is configured to direct the light 102 received from the scene 104 onto the image sensor 112 for detection by the pixels 130. The computer device 114 is configured to process the image data generated by the image sensor 112 to determine angle-of-incidence information about the received light 102, from which depth information about the scene 104 may be determined. It is appreciated that FIG. 15 is a simplified schematic representation that illustrates a number of components of the imaging system 100, such that additional features and components that may be useful or necessary for the practical operation of the imaging system 100 may not be specifically depicted.

The provision of the microlens array 144 interposed between the image sensor 112 and the scene 104, where each microlens 146 covers two or more pixels 130 of the image sensor 112, can impart the imaging system 100 with 3D imaging capabilities, including depth sensing capabilities. This is because the different pixels 130 in each pixel pair or group under a given microlens 146 have different angular responses, that is, they produce different pixel responses in response to varying the angle of incidence of the received light 102, similar to the odd and even pixel responses $i_{\pm}(H_x, H_y)$ introduced above with respect to TDM-based implementations. These different pixel responses $i_{\pm}(H_x, H_y)$ may be processed to provide uniform-field image data $i_{UF}(H_x,$ $H_y$) which can be used such as described above to provide position information about the imaging lens 106. In such implementations, the pixels 130 of the image sensor 112 may be referred to as phase detection pixels. It is appreciated that although the embodiment of FIG. 15 depicts a configuration where each microlens 146 covers a group of 2×1 pixels 130, other configurations are possible in other embodiments.

Figure 16:
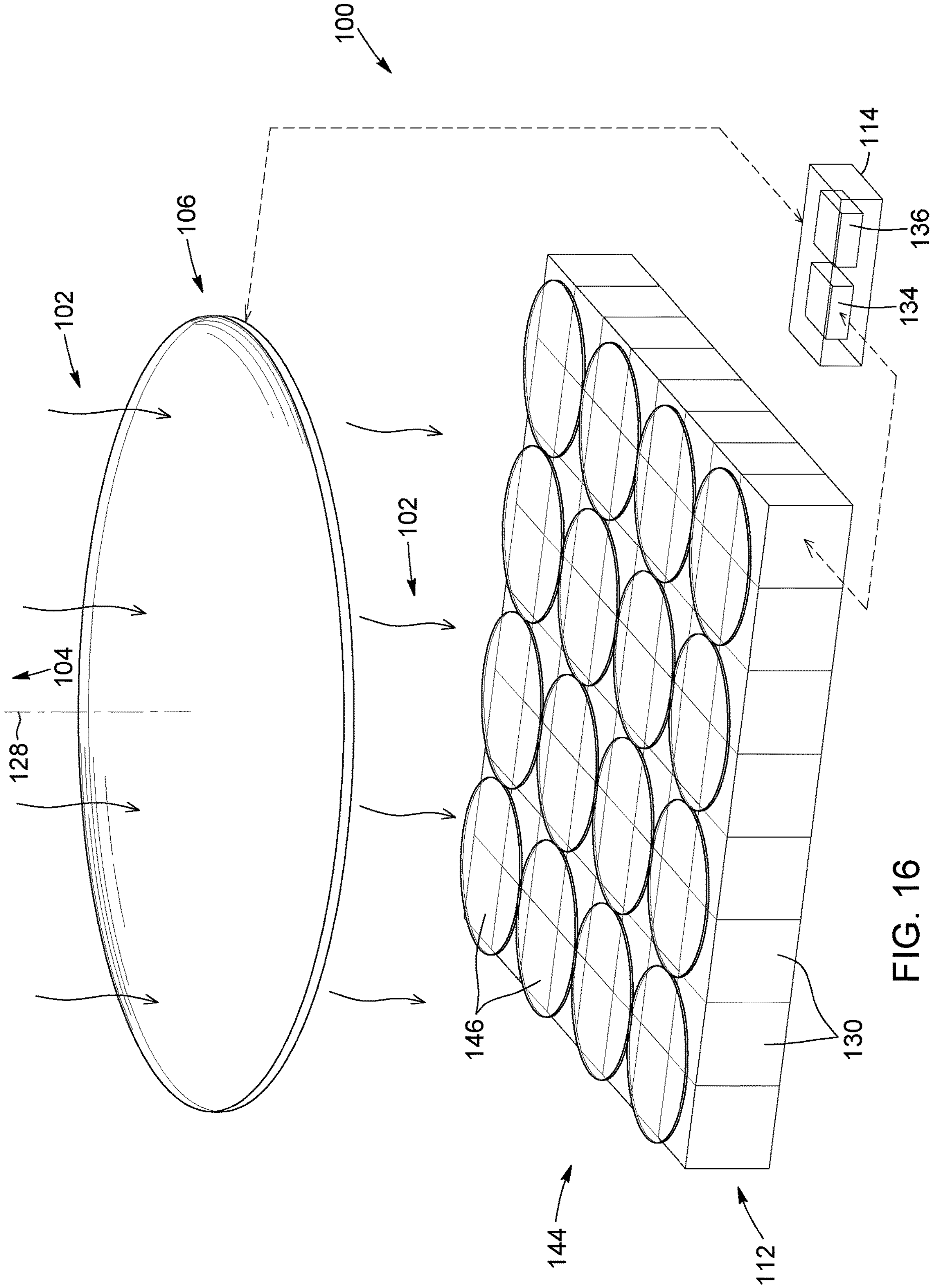
FIG. 16 is a schematic perspective view of a depth imaging system, in accordance with another embodiment.

For example, in some embodiments, each microlens 146 may cover a group of 2×2 pixels 130, as depicted in FIG. 16. Such arrangements can be referred to as quad-pixel arrangements. In other embodiments, each microlens may cover one pixel, but the pixel under the microlens may be split in two subpixels, thus providing a configuration similar to the one shown in FIG. 15. Such arrangements can be referred to as dual-pixel arrangements. It is appreciated that dual-pixel arrangements are considered herein as embodiments where each microlens covers two pixels of the image sensor, as in FIG. 15. In yet other embodiments, each microlens may cover one pixel, but the pixel under the microlens may be half-masked to provide angle-sensitivity capabilities.

It is appreciated that the structure, configuration, and operation of imaging devices using phase detection pixels, quad-pixel technology, dual-pixel technology, half-masked pixel technologies, and other approaches using microlens arrays over pixel arrays to provide 3D imaging capabilities are generally known in the art, and need not be described in detail herein other than to facilitate an understanding of the techniques disclosed herein.

In accordance with another aspect of the present description, there is provided a non-transitory computer readable storage medium having stored thereon computer readable instructions that, when executed by a processor, cause the processor to perform a method of lens position determination in an imaging system including an imaging lens, an image sensor having an array of pixels, and an angle-sensitive optical encoder interposed between the imaging lens and the image sensor. For example, the method can include receiving image data from a scene captured by the image sensor, the image sensor being configured to detect, with the array of pixels, light incident from the scene having passed through the imaging lens and the optical encoder, the optical encoder being configured to encode angle-dependent information about the incident light having passed therethrough in the captured image data in accordance with the angular response; generating a uniform-field image from the captured image data, the uniform-field image having an intensity profile that varies with image position in accordance with the angle-dependent information encoded in the captured image data; and determining current lens position information about the imaging lens from the intensity profile of the generated uniform-field image.

In accordance with another aspect of the present description, there is provided a computer device including a processor and a non-transitory computer readable storage medium such as described herein and being operatively coupled to the processor. FIGS. 1, 2, 5, 12, 13, 15 and 16 each depict an example of a computer device 114 that includes a processor 134 and a non-transitory computer readable storage medium 136 (also referred to above as a memory) operably connected to the processor 134.

Numerous modifications could be made to the embodiments described above without departing from the scope of the appended claims.

The invention claimed is:

1. A method of lens position determination in an imaging system comprising an imaging lens, an image sensor comprising an array of pixels, and an optical encoder having an angular response and interposed between the imaging lens and the image sensor, the method comprising:

capturing image data from a scene, the capturing comprising detecting, with the array of pixels of the image sensor, light incident from the scene having passed through the imaging lens and the optical encoder, the optical encoder being configured to encode angle-dependent information about the incident light having passed therethrough in the captured image data in accordance with the angular response;

generating a uniform-field image from the captured image data, the uniform-field image having an intensity profile that varies with image position in accordance with the angle-dependent information encoded in the captured image data; and determining current lens position information about the imaging lens from the intensity profile of the generated uniform-field image, wherein determining the current lens position information about the imaging lens comprises:

providing reference data relating an intensity profile of a reference uniform-field image to reference lens position information about the imaging lens; and determining the current lens position information from the intensity profile of the generated uniform-field image based on the reference data.

2. The method of claim 1, wherein:

capturing the image data comprises capturing the image data as a first set of pixel responses corresponding to a first set of pixels of the array of pixels of the image sensor and a second set of pixel responses corresponding to a second set of pixels of the array of pixels of the image sensor, the first set of pixel responses and the second set of pixel responses varying differently from each other as a function of angle of incidence in accordance with the angular response of the optical encoder; and generating the uniform-field image comprises generating the uniform-field image as a plurality of image points, the generating comprising:

computing a plurality of summed pixel responses based on a sum operation between the first set of pixel responses and the second set of pixel responses;

computing a plurality of differential pixel responses based on a difference operation between the first set of pixel responses and the second set of pixel responses; and determining an intensity value of each image point of the uniform-field image as a ratio of a respective one of the plurality of differential pixel responses to a respective one of the plurality of summed pixel responses, the plurality of intensity values of the plurality of image points defining the intensity profile of the uniform-field image.

3. The method of claim 1, wherein the angle-dependent information encoded in the image data by the optical encoder comprises a chief ray angle (CRA) function of the imaging lens over the array of pixels; a CRA shifting function of the optical encoder with respect to the array of pixels; and a range of angles of incidence within which the light incident from the scene reaches each pixel.

4. The method of claim 1, wherein determining the current lens position information from the intensity profile of the uniform-field image based on the reference data comprises:

determining an intensity profile difference between the intensity profile of the generated uniform-field image and the intensity profile of the reference uniform-field image;

determining lens position variation information from the intensity profile difference; and determining the current lens position information from the reference lens position information and the lens position variation information.

5. The method of claim 4, wherein determining the lens position variation information from the intensity profile difference comprises:

relating the intensity profile difference to a variation in a CRA function of the imaging lens; and determining the lens position variation information from the variation in the CRA function of the imaging lens using a model relating lens CRA function variations to changes in lens position.

6. The method of claim 1, wherein determining the current lens position information comprises:

determining an axial position of the imaging lens along an optical axis of the imaging lens;

determining a first lateral position of the imaging lens along a first lateral direction perpendicular to the optical axis of the imaging lens;

determining a second lateral position of the imaging lens along a second lateral direction perpendicular to both the optical axis of the imaging lens and the first lateral direction;

determining a first tilt angle of the imaging lens relative to the first lateral direction; and determining a second tilt angle of the imaging lens relative to the second lateral direction.

7. The method of claim 1, wherein:

the scene is representative of a uniform field;

the captured image data comprises at least one image of the scene; and the uniform-field image is generated from the at least one image of the scene without performing a prior step of removing depth cues from the at least one image of the scene.

8. The method of claim 1, wherein:

the scene is not representative of a uniform field;

the captured image data comprises one or more images of the scene; and the method comprises removing depth cues from the one or more images of the scene, combining the one or more images of the scene with removed depth cues into a fused image of the scene, and generating the uniform-field image from the fused image of the scene.

9. The method of claim 1, wherein the optical encoder comprises a transmissive diffraction mask (TDM), the TDM being configured to diffract the light incident from the scene having passed through the imaging lens to generate diffracted light, the diffracted light having the angle-dependent information encoded therein for detection by the image sensor as the captured image data.

10. The method of claim 1, wherein the optical encoder comprises an array of microlenses, each microlens covering at least two pixels of the image sensor.

11. A method of focus distance adjustment in an imaging system comprising an imaging lens, an image sensor comprising an array of pixels, and an optical encoder having an angular response and interposed between the imaging lens and the image sensor, the method comprising:

providing a target focus distance at which to set the imaging system;

determining a target lens-to-sensor distance between the imaging lens and the image sensor corresponding to the target focus distance; and performing a lens position adjustment operation comprising one or more iterative cycles, each iterative cycle comprising:

moving the imaging lens with respect to the image sensor based on the target lens-to-sensor distance;

determining, using a method of lens position determination, current lens position information about the imaging lens, the method of lens position determination comprising:

capturing image data from a scene, the capturing comprising detecting, with the array of pixels of the image sensor, light incident from the scene having passed through the imaging lens and the optical encoder, the optical encoder being configured to encode angle-dependent information about the incident light having passed therethrough in the captured image data in accordance with the angular response; and generating a uniform-field image from the captured image data, the uniform-field image having an intensity profile that varies with image position in accordance with the angle-dependent information encoded in the captured image data;

wherein the current lens position information about the imaging lens is determined from the intensity profile of the generated uniform-field image, and wherein the current lens position information comprises a current lens-to-sensor distance between the imaging lens and the image sensor;

determining whether there is a match between the current lens-to-sensor distance and the target lens-to-sensor distance;

if there is a match between the current lens-to-sensor distance and the target lens-to-sensor distance, terminating the lens position adjustment operation and determining that the imaging system has been set at the target focus distance; and if there is not a match between the current lens-to-sensor distance and the target lens-to-sensor distance, performing another iterative cycle.

12. The method of claim 11, wherein determining the target lens-to-sensor distance corresponding to the target focus distance comprises computing the target lens-to-sensor distance from the target focus distance and a focal length of the imaging lens according to $z_{s,target}=[(1/f)-(1/z_{f,target})]^{-1}$, where $z_{s,target}$ is the target lens-to-sensor distance, f is the focal length of the imaging lens, and $z_{f,target}$ is the target focus distance.

13. A non-transitory computer readable storage medium having stored thereon computer readable instructions that, when executed by a processor, cause the processor to perform a method of lens position determination in an imaging system comprising an imaging lens, an image sensor comprising an array of pixels, and an optical encoder having an angular response and interposed between the imaging lens and the image sensor, the method comprising:

receiving image data from a scene captured by the image sensor, the image sensor being configured to detect, with the array of pixels, light incident from the scene having passed through the imaging lens and the optical encoder, the optical encoder being configured to encode angle-dependent information about the incident light having passed therethrough in the captured image data in accordance with the angular response;

generating a uniform-field image from the captured image data, the uniform-field image having an intensity profile that varies with image position in accordance with the angle-dependent information encoded in the captured image data; and determining current lens position information about the imaging lens from the intensity profile of the generated uniform-field image, wherein determining the current lens position information about the imaging lens comprises:

providing reference data relating an intensity profile of a reference uniform-field image to reference lens position information about the imaging lens; and determining the current lens position information from the intensity profile of the generated uniform-field image based on the reference data.

14. The non-transitory computer readable storage medium of claim 13, wherein:

the captured image data comprises a first set of pixel responses corresponding to a first set of pixels of the array of pixels of the image sensor and a second set of pixel responses corresponding to a second set of pixels of the array of pixels of the image sensor, the first set of pixel responses and the second set of pixel responses varying differently from each other as a function of angle of incidence in accordance with the angular response of the optical encoder; and generating the uniform-field image comprises generating the uniform-field image as a plurality of image points, the generating comprising:

computing a plurality of summed pixel responses based on a sum operation between the first set of pixel responses and the second set of pixel responses;

computing a plurality of differential pixel responses based on a difference operation between the first set of pixel responses and the second set of pixel responses; and determining an intensity value of each image point of the uniform-field image as a ratio of a respective one of the plurality of differential pixel responses to a respective one of the plurality of summed pixel responses, the plurality of intensity values of the plurality of image points defining the intensity profile of the uniform-field image.

15. An imaging system having lens position determination capabilities, the imaging system comprising:

an imaging lens;

an image sensor comprising an array of pixels;

an optical encoder having an angular response and interposed between the imaging lens and the image sensor; and a computer device operatively coupled to the image sensor and comprising a processor and a non-transitory computer readable storage medium having stored thereon computer readable instructions that, when executed by the processor, cause the processor to perform operations, wherein the image sensor is configured to capture image data from a scene by detecting, with the array of pixels, light incident from the scene having passed through the imaging lens and the optical encoder, wherein the optical encoder is configured to encode angle-dependent information about the incident light having passed therethrough in the captured image data in accordance with the angular response, wherein the optical encoder comprises a transmissive diffraction mask (TDM), the TDM being configured to diffract the light incident from the scene having passed through the imaging lens to generate diffracted light, the diffracted light having the angle-dependent information encoded therein for detection by the image sensor as the captured image data, and wherein the operations performed by the processor comprise:

receiving the captured image data from the scene captured by the image sensor;

generating a uniform-field image from the captured image data, the uniform-field image having an intensity profile that varies with image position in accordance with the angle-dependent information encoded in the captured image data; and determining current lens position information about the imaging lens from the intensity profile of the generated uniform-field image.

16. The imaging system of claim 15, wherein:

the image sensor is configured to capture the image data as a first set of pixel responses corresponding to a first set of pixels of the array of pixels and a second set of pixel responses corresponding to a second set of pixels of the array of pixels of the image sensor, the first set of pixel responses and the second set of pixel responses varying differently from each other as a function of angle of incidence in accordance with the angular response of the optical encoder; and generating the uniform-field image comprises generating the uniform-field image as a plurality of image points, the generating comprising:

computing a plurality of summed pixel responses based on a sum operation between the first set of pixel responses and the second set of pixel responses;

computing a plurality of differential pixel responses based on a difference operation between the first set of pixel responses and the second set of pixel responses; and determining an intensity value of each image point of the uniform-field image as a ratio of a respective one of the plurality of differential pixel responses to a respective one of the plurality of summed pixel responses, the plurality of intensity values of the plurality of image points defining the intensity profile of the uniform-field image.

17. The imaging system of claim 15, wherein:

the TDM comprises a first set of diffraction gratings having a first grating axis orientation and a second set of diffraction gratings having a second grating axis orientation, the first grating axis orientation being perpendicular to the second grating axis orientation;

generating the uniform-field image comprises:

generating a first portion of the uniform-field image from a first portion of the captured image data having angle-dependent information encoded therein by the first set of diffraction gratings; and generating a second portion of the uniform-field image from a second portion of the captured image data having angle-dependent information encoded therein by the second set of diffraction gratings; and determining the current lens position information comprises:

determining first lens position information from a first intensity profile of the first portion of the uniform-field image;

determining second lens position information from a second intensity profile of the second portion of the uniform-field image; and determining the current lens position information from the first lens position information and the second lens position information.

18. A method of lens position determination in an imaging system comprising an imaging lens, an image sensor comprising an array of pixels, and an optical encoder having an angular response and interposed between the imaging lens and the image sensor, the method comprising:

capturing image data from a scene, wherein the scene is representative of a uniform field and the captured image data comprises at least one image of the scene, the capturing comprising detecting, with the array of pixels of the image sensor, light incident from the scene having passed through the imaging lens and the optical encoder, the optical encoder being configured to encode angle-dependent information about the incident light having passed therethrough in the captured image data in accordance with the angular response;

generating a uniform-field image from the captured image data, the uniform-field image having an intensity profile that varies with image position in accordance with the angle-dependent information encoded in the captured image data, wherein the uniform-field image is generated from the at least one image of the scene without performing a prior step of removing depth cues from the at least one image of the scene; and determining current lens position information about the imaging lens from the intensity profile of the generated uniform-field image.

19. The method of claim 18, wherein the optical encoder comprises a transmissive diffraction mask (TDM), the TDM being configured to diffract the light incident from the scene having passed through the imaging lens to generate diffracted light, the diffracted light having the angle-dependent information encoded therein for detection by the image sensor as the captured image data.

20. A method of lens position determination in an imaging system comprising an imaging lens, an image sensor comprising an array of pixels, and an optical encoder having an angular response and interposed between the imaging lens and the image sensor, the method comprising:

capturing image data from a scene, wherein the scene is not representative of a uniform field and the captured image data comprises one or more images of the scene, the capturing comprising detecting, with the array of pixels of the image sensor, light incident from the scene having passed through the imaging lens and the optical encoder, the optical encoder being configured to encode angle-dependent information about the incident light having passed therethrough in the captured image data in accordance with the angular response;

removing depth cues from the one or more images of the scene;

combining the one or more images of the scene with removed depth cues into a fused image of the scene;

generating a uniform-field image from the fused image of the scene, the uniform-field image having an intensity profile that varies with image position in accordance with the angle-dependent information encoded in the captured image data; and determining current lens position information about the imaging lens from the intensity profile of the generated uniform-field image.

21. The method of claim 20, wherein the optical encoder comprises a transmissive diffraction mask (TDM), the TDM being configured to diffract the light incident from the scene having passed through the imaging lens to generate diffracted light, the diffracted light having the angle-dependent information encoded therein for detection by the image sensor as the captured image data.

* * * * *